(12) United States Patent
Gibson

(10) Patent No.: US 11,334,594 B2
(45) Date of Patent: May 17, 2022

(54) DATA MODEL TRANSFORMATION

(71) Applicant: Microsoft Technology Licensing, LLC, Redmond, WA (US)

(72) Inventor: William Edward Gibson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/002,596

(22) Filed: Aug. 25, 2020

(65) Prior Publication Data

US 2021/0117437 A1 Apr. 22, 2021

Related U.S. Application Data

(60) Provisional application No. 62/923,495, filed on Oct. 19, 2019.

(51) Int. Cl.
*G06F 16/00* (2019.01)
*G06F 16/25* (2019.01)
*G06F 3/0482* (2013.01)
*G06F 16/28* (2019.01)

(52) U.S. Cl.
CPC .......... *G06F 16/258* (2019.01); *G06F 3/0482* (2013.01); *G06F 16/252* (2019.01); *G06F 16/254* (2019.01); *G06F 16/283* (2019.01)

(58) Field of Classification Search
CPC .... G06F 16/254; G06F 16/84; G06F 16/0482; G06F 16/252; G06F 16/283; G06F 16/258
See application file for complete search history.

(56) References Cited

U.S. PATENT DOCUMENTS

| | | | | |
|---|---|---|---|---|
| 7,853,553 | B2* | 12/2010 | Lankinen | G06F 16/258 707/602 |
| 9,552,400 | B2* | 1/2017 | Krishnan | G06F 16/254 |
| 10,346,374 | B1* | 7/2019 | Johnson | G06F 16/254 |

(Continued)

OTHER PUBLICATIONS

Doan, et al., "Reconciling Schemas of Disparate Data Sources: A Machine-Learning Approach", In Sigmod Record. vol. 30. No. 2, May 21, 2001, 12 Pages.

(Continued)

*Primary Examiner* — Cheryl Lewis
(74) *Attorney, Agent, or Firm* — Rainier Patents, P.S.

(57) ABSTRACT

Described herein are systems and methods of transforming data models, for example, creating a data warehouse. A directives model may be loaded based upon a parsed directives file. An entity model may be loaded, and tables, attributes, and foreign keys of a data warehouse model may be created based upon the directives model and the entity model. Mappings may be created between tables, columns, and foreign keys of the data warehouse model and entities, attributes, and relationships, respectively, of the entity model. Code to define a data warehouse may be generated based upon the tables, attributes, and foreign keys of the data warehouse model. Code to transfer data from the source data source can be generated based upon the created mappings. A lineage report can be generated that provides information identifying a corresponding source for each table and column in the data warehouse.

20 Claims, 15 Drawing Sheets

(56) References Cited

U.S. PATENT DOCUMENTS

| | | | | |
|---|---|---|---|---|
| 2004/0205562 | A1* | 10/2004 | Rozek | G06F 40/151 |
| | | | | 715/239 |
| 2011/0153562 | A1* | 6/2011 | Howard | G06F 16/275 |
| | | | | 707/620 |
| 2012/0265726 | A1* | 10/2012 | Padmanabhan | G06F 16/214 |
| | | | | 707/602 |
| 2012/0330911 | A1* | 12/2012 | Gruenheid | G06F 16/215 |
| | | | | 707/694 |
| 2013/0031117 | A1* | 1/2013 | Mandelstein | G06F 16/84 |
| | | | | 707/758 |
| 2017/0293668 | A1* | 10/2017 | Crabtree | G06F 16/254 |
| 2019/0258645 | A1* | 8/2019 | Crabtree | G06F 16/254 |

OTHER PUBLICATIONS

Legler, et al., "A Classification of Schema Mappings and Analysis of Mapping Tools", https://www.researchgate.net/publication/221323551_A_Classification_of_Schema_Mappings_and_Analysis_of_Mapping_Tools, Mar. 9, 2007, 29 Pages.

Loesgen, et al., "Microsoft BizTalk Server 2010 Unleased: Chapter 1-3", In: Microsoft BizTalk Server 2010 Unleased: Chapter 3, Oct. 12, 2011, 145 Pages.

"International Search Report and Written Opinion Issued in PCT Application No. PCT/US2020/054463", dated Jan. 21, 2021, 12 Pages.

* cited by examiner

502 — + Data warehouse design  Settings
302

Dimensional modeling pattern defaults
404

| Transform patterns | Code patterns |
|---|---|

Fact table prefix: [fact_]
Fact table suffix: [ ]
Dimension table prefix: [dim_]
Dimension table suffix: [ ]
Surrogate key suffix: [Key]
Primary key suffix: [PK]
Date key suffix: [value]

Transform procedure prefix: [usp_]
Transform view prefix: [tv_]
Transform view prefix: [tv_]
Transform table prefix: [tt]
Transform table view prefix: [ttv]
Dimensional view prefix: [v_]
Dimensional view suffix: [ ]

DATA MODEL TRANSFORMATION

BACKGROUND

Different data stores may have different purposes and thus use different representations of data structure (called data models) to store data. For example, a transactional data store may store data using one data model that is optimized for processing transactions, and a reporting data store may store data using another data model that is optimized for generating reports. A data warehouse may be a type of reporting data store designed to support decision-making in an organization. A typical data warehouse may be batch updated on a periodic basis and contain an enormous amount of data. For example, large retail organizations may store one hundred gigabytes or more of transaction history in a data warehouse. The data in a data warehouse can typically be historical and static and may also contain numerous summaries. It can be structured to support a variety of analyses, including elaborate queries on large amounts of data that can require extensive searching.

SUMMARY

The present concepts describe systems and methods for transforming or converting from one data model to another data model. Described herein is one example system for creating a data warehouse, comprising: a processing system comprising a processor and a memory having computer-executable instructions stored thereupon which, when executed by the processor, cause the processing system to: receive directive information that describes how to map a source data model to a target data model using one or more predefined patterns; generate code to create the target data model based, at least in part, upon the directive information and the source data model; and generate code using pattern templates to load the data warehouse based, at least in part, upon the directive information and the source data model.

Also described herein is one example method of creating a data warehouse, comprising: parsing a directives file; loading a directives model based, at least in part, upon the parsed directives file; loading an entity model based, at least in part, upon a source data source identified in the parsed directives file; creating tables, attributes, and foreign keys of a data warehouse model based, at least in part, upon the directives model and the entity model; creating mappings between tables of the data warehouse model and entities of the entity model, columns of the data warehouse model and attributes of the entity model, and foreign keys of the data warehouse model and relationships of the entity model; generating a data warehouse based, at least in part, upon the tables, attributes, and foreign keys of the data warehouse model; generating code to transfer data from the source data source based, at least in part, upon the created mappings; and generating a lineage report that provides information identifying a corresponding source for each table and column in the data warehouse.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3-11 are graphical user interfaces that illustrate an example process of transforming data models, consistent with the present concepts.

DETAILED DESCRIPTION

Figure 1:
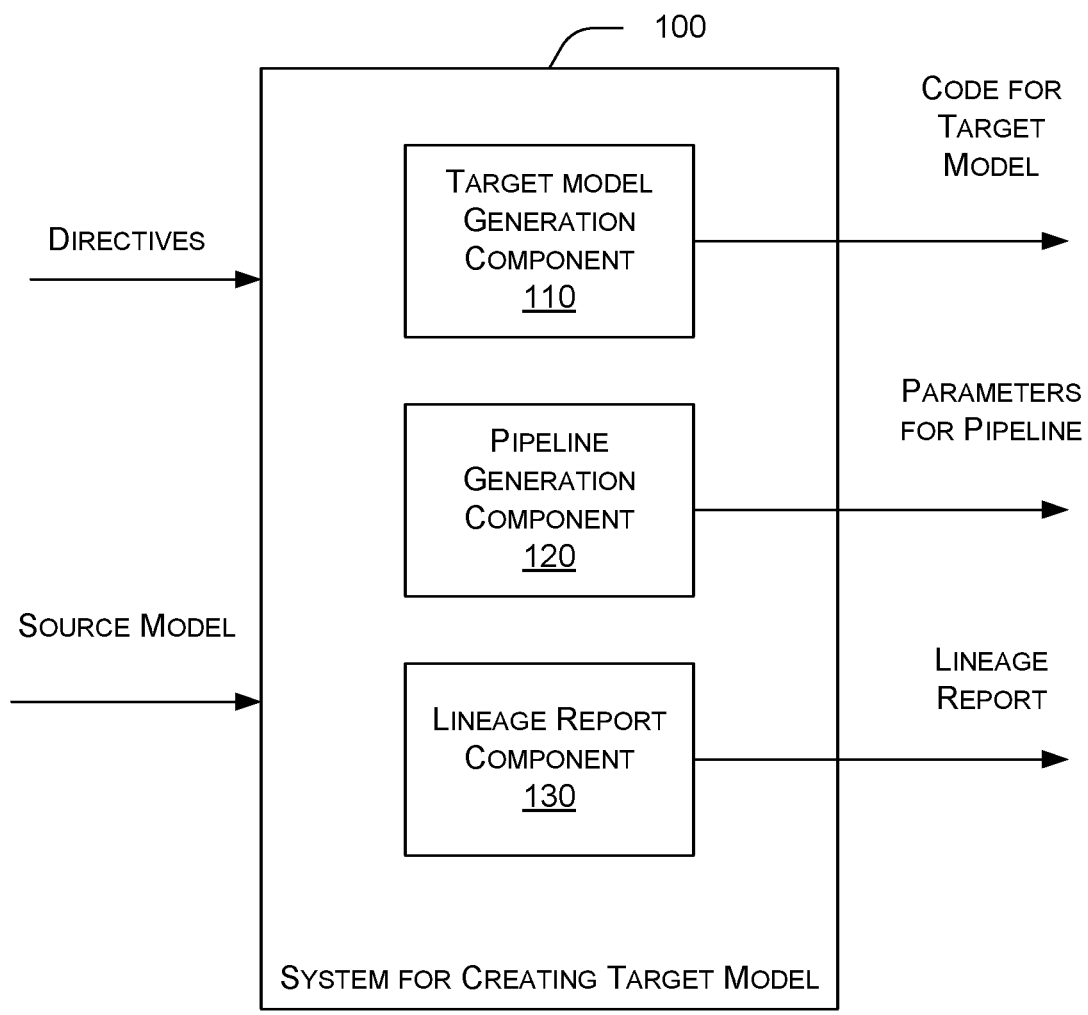
FIG. 1 is a functional block diagram that illustrates an example system for transforming data models, consistent with the present concepts.

Various technologies pertaining to transforming data models, i.e., generating a target data model (e.g., a data warehouse) from a source data model (e.g., a database) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects may be practiced without these specific details. In other instances, well-known structures and devices are shown in block diagram form in order to facilitate describing one or more aspects. Further, functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding transforming data models (e.g., generating and/or loading a data warehouse from a source database). What follows are one or more example systems and methods.

Aspects of the subject disclosure pertain to the technical problem of transforming data models. The technical features associated with addressing this problem may involve receiving directive information that describes how to map a source data model to a target data model using one or more predefined pattern templates; generating code to create the target data model based, at least in part, upon the directive information and the source data model; and generating code to load the target data model based, at least in part, upon the directive information and the source data model. Accordingly, aspects of these technical features exhibit technical effects of expediently defining a target data model from a source data model and creating a target data model that is more efficient for its purpose, for example, by reducing consumption of computer resources, bandwidth, and/or response time for a query.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

There are many reasons to transform between different data models. An operational database may be optimized for transactional processing, such as data inserts and data updates. Such an optimization may involve normalization, i.e., storing data only once. For instance, customer information may be stored in a customer table, order information may be stored in an order table, and order line information may be stored in an order line table. Thus, a transaction may be processed by updating information independently of other information in the database. Storing the same data multiple times and/or in multiple places in a database can make transaction processing more costly to insert or update data.

A data warehouse may be structured to optimize for reporting. Reporting on data, for example, generating reports on sales, may involve pulling together different types of data, such as sales transaction data, product data, quantities, dollar amounts, customer data, etc., into a data structure that enables efficient reporting.

A data model that is optimized for transaction processing may not be optimized for reporting, such as reports on past sales transactions. Reporting may involve, for example, many inefficient join operations that link together data from multiple tables that contain information needed to generate the reporting information. Accordingly, data stored in transactional databases may be fed into a different data structure in a data warehouse, which is then used to generate reports. This process may involve pre-processing the structure of the data to bring data together into a pattern that is more easily reported on, e.g., denormalization or other transformations such as aggregation. Thus, the structure of the data can enable queries to be run on the data more efficiently. A data warehouse can be created with a data structure that is optimized for reporting purposes, rather than for updating purposes, by factoring the data for individual reports.

For example, reporting may be desired on sales information by different dimensions (e.g., sales by quarter, sales by customers, sales by segments, sales by regions, etc.). Therefore, a data warehouse could be optimized by having separate tables, such as customer information in a table and linking sales information about that customer to that table. For instance, if an order has multiple order lines, the information associated with the order may be pushed down to or denormalized to the order lines, such that every order line would have a copy of the information that was associated with the order, for example, date, store, salesperson, product, price, quantity, value, discount, etc. The information representing order lines combined with denormalized information representing each order may be referred to as a fact table. A fact table may represent a business process (e.g., the order process, in this case) that is to be measured in a report. Each row in a fact table may be associated with a row in one or more dimension tables. Each dimension may represent a way in which the fact data may be organized or summarized for reporting purposes. Designing a data warehouse may involve optimizing between facts and dimensions. For example, fact tables may be surrounded by dimension tables in a star schema design. For instance, a sales order line fact may be linked and surrounded by store dimension, product dimension, customer dimension, date dimension, etc., as nodes.

Conventionally, the process of transforming one data model into another (e.g., creating a data warehouse) can be a complex task that is prone to errors. For example, a human designer typically would think through how to denormalize the data in a source data model and design a target data model for a new data warehouse. Then, the designer would have to manually write the schema code by defining how tables in the target data model would be structured and by defining how the tables would be populated from the data in the source data model, which may be structured in a highly normalized fashion. That is, in the source data model, each concept may be in a separate table, and the designer would have to figure out a way to denormalize the data and bring them together in the target data model for reporting. For example, information about regions and countries in the source data model may be brought together and denormalized onto the customer dimension in the target data model. As another example, product category information and stock information may be denormalized onto the product dimension. So, the designer may produce star schemas of data models. This is often a very involved process that takes a very long time. And changes to the schemas require complementary changes to the extract-transform-load ("ETL") code that is used for extracting data from the source, transforming the data, and loading the data into the target.

For these reasons, the time to insight was conventionally very long. The time to insight is a term of art describing the amount of time it takes to gain a particular insight from the existing data. The time to insight would typically include the time to determine the type of reporting desired, the time to design schemas that would provide the data structure that can provide the desired reports, the time to manually write schema code (e.g., in structured query language ("SQL") language) for creating a new data model such as a data warehouse, the time to manually write the transform code such as ETL code, the time to create the new data model, and the time to generate reports.

The present concepts describe transforming data from one data model to another. The transformation to produce data structures that conform to the target may be described, and the data transform code to move the data from the source data model to the target data model may be produced, according to a series of robust patterns that allow high performance of the target data model. That is, the present concepts are directed to patterned transformations from one data structure to another data structure. Example forms of transformations include denormalization and aggregation. The source and the target may be any data model, such as a data model described using the common data model ("CDM") conventions, a database, a data mart, a data warehouse, or a data lake; a file system, or a key-value store;

a relational database or a non-relational database; and supporting any programming language such as SQL, Python, C++, Java, or PHP, etc.

In one example implementation of the present concepts, a source may be a highly normalized data model. A designer may nominate a table in the source as the basis for a fact or a dimension in a target, such as a data warehouse. The designer may also select or describe a specific part of the data in the table from the source to be loaded into the fact or the dimension in the target. Based on the relationships among the tables in the source, the designer can describe how to navigate those relationship to grab data, denormalize it, and pull it down onto facts or dimensions in the target. For example, the designer can describe sales order information to be pulled down onto an order line fact, so that every order line in the fact table in the target has copies of the order information in it. As another example, the designer can describe how to navigate the relationship from customer to region and then to country, and pull down the country name and pull down the region code onto the customer dimension, so that the customer dimension in the target contains information about region and country. Conventionally, the designer would have to manually write the code for the schema of the dimension and fact tables, and then manually write the ETL code to copy or transform the data from the source to the target.

The present concepts allow the designer to express those intentions or desire to create a target data model (e.g., a data warehouse) through a set of directives. The designer can designate how to manipulate the source data model to produce the target data model. The present concepts may leverage the structure of the source tables to allow the designer to express, through a set of directives, how to build a target data model, such as a data warehouse by specifying which entities in the source should be converted to facts or dimensions in the target, and specifying denormalization in a declarative manner or via patterns (e.g., based on attributes). The designer can also specify data aggregations. Because aggregating data on the fly during a query can add processing time, pre-aggregating data is a common design feature of data warehouses, where tables in the data warehouse are pre-populated with aggregated data that is likely to be needed in pulling queries. Designers can describe, for example, new columns that should be added to the dimension and fact tables in the target that will contain the aggregation (e.g., sum, average, product, maximum, minimum, etc.) of values from the source. Thus, aggregations can trace relationships to many instances of data in the source.

The present concepts may use surrogate keys in the target data model. Information in a source data model (e.g., an operational database) is often keyed on business keys, i.e., values that are of business significance, such as social security numbers, phone numbers, email addresses, or any information that is relevant to business. The target created using the present concepts may address concerns associated with storing information that is keyed to such confidential, private, or sensitive data by using surrogate keys instead. Surrogate keys may be meaningless keys, such as a sequentially assigned number or a globally unique identifier ("GUID"), that are assigned to data. For example, transaction data in many tables in the target may be linked to a contact person by being assigned a surrogate key associated with the contact person rather than being assigned sensitive data corresponding to the contact person. Using surrogate keys is also advantageous because other key data (e.g., names, phone numbers, email addresses, etc.) can be changed, which would require updating the key data in many tables. The present concepts can automatically generate code that substitutes business keys with surrogate keys. For example, the designer may identify specific business keys, and surrogate keys may be automatically generated to be used instead of the business keys when linking data in tables.

The present concepts may also use surrogate keys to report on times or dates. Transaction data often have dates associated with them. Organizing data based on dates and generating reports on transactions by performing join operations on date fields can be inefficient. Accordingly, a target data model (e.g., a data warehouse) created using the present concepts may include a date dimension and/or a time dimension that includes all dates (past and future) and all times of the day (e.g., in seconds, minutes, or hours depending on whatever granularity is desired for reporting purposes) already prepopulated. And then, every date in the date dimension may be given a surrogate key, and every time of the day in the time dimension may be given a surrogate key. Therefore, as transactions records come in to the target data warehouse, the date can be substituted with a surrogate key matching the date from the date dimension, and the time can be substituted with a surrogate key matching the time from the time dimension. Moreover, a particular date in the date dimension may include information about which year, quarter, month, or the day of the week the particular date belongs to. With this data structure, generating reports based on date and time may be faster and more efficient. For example, all sales transactions that occurred in a specific quarter may be pulled using the surrogate keys for dates. Also, transactions based on time of the day (e.g., morning sales versus afternoon sales) can be reported on.

The present concepts may apply the above-described patterns to automatically generate code for creating a target data model and to automatically generate transform code for copying data from a source data model to the target data model. For example, a few tens of lines of directives code may be used by the present concepts to automatically generate several thousands of lines of SQL code for creating a target data warehouse and of ETL code for transferring data. If these codes were typed manually, they may be prone to errors (e.g., syntactical and logical bugs). However, using the present concepts, automatically generated code may be error free.

The present concepts may allow the designer to specify the schema without necessarily having to manually write directives code. For example, the designer may be provided with a GUI interface to specify the schema visually and conceptually, such as by mapping the data in the source to the target, table by table, and column by column, attribute by attribute. Then, the present concepts can automatically generate schema code (e.g., in SQL) and ETL code (e.g., in SQL or Python). Thus, the present concepts may "de-skill" the process of creating data warehouses. The designer need not be a skilled programmer. In addition to saving time for designers and generating error-free code, automatically generating code can advantageously provide consistent code. The automatically generated ETL code can also be optimized so that the target data model creation process runs faster. Furthermore, the code may be optimized by having the designer optimize the generator rather than revising the code manually, such that the improved generator can repeatedly produce optimized code for future target data models. Also, the present concepts may include tracing the lineage of information in the target from the source based on the mappings.

Moreover, converting data models, such as creating a data warehouse, conventionally took days, weeks, or months, but with the present concepts, a target data model can be created in much shorter time. This enables designers to quickly try various different designs for a data warehouse. That is, if the first design for a data warehouse is unsatisfactory, the designer can easily tweak the design and create a second data warehouse very quickly. Or, even after a satisfactory data warehouse is created and used for some time, reporting requirements may change in the future such that a re-design becomes desirable or even necessary. The present concepts make it easy to tweak, update, and/or optimize data models for new or changing purposes, such as new reporting requirements, by easily changing the design (i.e., the data structure) of a new data model. Conventionally, such a trial-and-error approach or such an evaluation of multiple design choices was infeasible, because the amount of time and effort required to set up and build multiple target data model were prohibitive. And for the same reasons, designers were often forced to continue using a less-than-optimal design, because the burden of creating an improved design was a high hurdle. The present concepts provide technological improvements in quickly and easily designing and creating target data models from source data models. For example, rather than following a conventional approach that can take weeks to design a target data model, manually write code, and populate the target data model, the present concepts can be employed to visually design a target data model, automatically generate code, and build the target data model in one afternoon.

Consistent with the present concepts, mappings of data in the source to the target, as specified by the designer, may first be stored as a mapping model. Then, a generator may convert the mappings into code. The automatically generated code may in SQL or ADF, for example. By separating the stored mappings from the generator, the generator can be updated or replaced without affecting the mapping process. For instance, a single target data model may be mapped to alternative physical data storage implementations, such as a SQL database or a CDM, or may be Parquet or comma-separated value ("CSV") formatted files in a data lake, and the generator can be changed to produce the desired target, whereas the process that the designer may go through to create the mappings can remain the same.

Described herein are example systems and methods for creating a target data model (e.g., a data warehouse) and/or mapping the target data model to an existing target data model, and related artifacts from a source model (e.g., a source database). Based upon the source data model and a set of user directives, code for creating the target data model (e.g., a data warehouse) may be automatically generated, including, for example, staging tables, dimensional model tables (e.g., fact and dimension tables), and transform procedures, with intermediate views and tables, that are used to load the dimensional model from the staging tables. In addition, the systems and methods can generate computer instructions for copying and transforming the data (e.g., ETL code). In some implementations, this can include generating parameters to customize a pipeline template to copy source data to the staging tables in the target data model and to trigger the transformation. In some implementations, the systems and methods can generate a lineage report that lists each table in the dimensional model (e.g., a data warehouse) with its corresponding source for every column.

The systems and methods for mapping data models and transforming data according to the mapping described herein can include representing a source data model, including the schema and other metadata, that may represent different types of data source (e.g., a common data model (CDM) folder or a SQL database). In some implementations, CDM can include a set of standardized, extensible data schemas. This collection of predefined schemas can include entities, attributes, semantic metadata, and relationships. The source data model can be populated from a data storage system that has associated schema and/or metadata (e.g., a CDM folder or a SQL data warehouse), or from a metadata source (such as a set of CDM entity definitions or a data model in a data modeling tool).

The systems and methods can represent a target data model, including schema and other metadata. The target data model may represent a target data storage system (e.g., a CDM folder or a relational database) or target metadata only, such as a set of CDM entity definitions. The target data model can be populated from an existing target data storage system (e.g., a CDM folder or a SQL data warehouse) or target metadata (e.g., an existing set of metadata definitions).

The systems and methods can accept user instructions that describe how to map one or more source data models to either (1) a new target data model or (2) a predefined target data model loaded from an existing data storage system or metadata definitions. The instructions can specify schema mapping and data transformation patterns to be used. The mapping patterns and rules may include well-known patterns and rules that transform the source data model to the target data model depending on the purpose of the target data model. For example, when the intent is to use the target data model for reporting, entities in the source data model may be denormalized or aggregated into entities in the target data model. Other mapping patterns can include projection, filtering, derivation, renaming, and injection of new elements. The mapping patterns may correlate to pluggable transform modules available that generate code to transform data between the source and target data storage systems.

In some implementations, the systems and methods can compute a fine-grained mapping between elements in the target data model and elements in the source data models based on the user instructions such that it is possible to trace how every element of the target data model is mapped from the source data models. The systems and methods can generate computer code that defines a target data store that conforms to the structure defined by the target data model in a relational or other kind of data storage system. For example, where the target is a relational data storage system, the generated code may be data definition language ("DDL") statements in the SQL language.

In some implementations, the systems and methods can employ a pluggable system for generating computer code from the detailed mapping between source data models and a target data model, where the generated code may cause data to be transformed from data stores that conform to source data models to a data store that conforms to the target data model according to the mapping. Pluggable transform modules may implement the patterns used in the user instructions and generate the necessary code as required by the transformation process, including, but not limited to, SQL for transformations occurring within relational databases and/or data factory dataflow definitions for transformations occurring between different data storage systems.

In some implementations, the systems and methods can include exporting a lineage report that traces the target data model elements to their origin in the source data models. This lineage information can additionally be loaded to a separate data catalog system, for example, for reporting and query.

The systems and methods can dramatically reduce the time taken, skills required, and/or cost to create a target data model (e.g., a data warehouse) and/or parts of the upstream data loading pipeline. By accelerating the process and reducing the cost, the systems and methods can make it feasible to rapidly change the design of a target data model to adjust to changing reporting requirements, and/or to create and maintain multiple parallel target data models that support different reporting requirements.

In some implementations, the present concepts can be used in industry-specific/vertical analytics solutions. In these domain-specific solutions, users can be provided with an industry-specific common data model ("CDM") from which a data warehouse solution has been provided using the present concepts. By providing a pre-defined model and a set of directives that describe an initial target data model design, even if a user chooses to change the design, the user can have a complete target data model solution (e.g., a data warehouse and analytics and reporting solutions) defined in a fraction of the time it would take her to build a comparable solution if manually writing the required computer code by hand.

FIG. 1 is a functional block diagram that illustrates an example system for transforming data models, consistent with the present concepts. For purposes of explanation and not limitation, the example system is discussed in the context of generation of a data warehouse as the target data model. However, the present concepts described herein are not limited to generation of a data warehouse as the target data model but rather can be any suitable electronic data organization system including, for example, a relational database, an object-oriented database, and/or a collection of structured files in a file system or data lake. Referring to FIG. 1, a system 100 for creating a target model (a data warehouse in this example) is illustrated. The system 100 may include one or more of: a target model generation component 110, a pipeline generation component 120, and a lineage report component 130.

The system 100 can receive directive information that describes how to map a source data model to a target data model (e.g., data warehouse) using one or more predefined pattern templates. The target model generation component 110 can generate code (e.g., SQL code) to create the target data model (e.g., data warehouse) based, at least in part, upon the directive information.

The pipeline generation component 120 can generate parameters used to generate code to load the data warehouse based, at least in part, upon the directive information. The lineage report component 130 can provide lineage information that shows the origin of every table and column in the target model (e.g., a data warehouse).

The system 100 may take a source model (e.g., an entity model) that describes a data source and a set of user-defined design directives and may generate a data warehouse implementation (e.g., a complete SQL data warehouse ("SQL DW") implementation) and parameters to configure a pipeline (e.g., Microsoft® Azure® Data Factory (ADF), Amazon® Web Services Data Pipeline, Apache® NiFi, etc.) for loading the data warehouse ("DW"). The resulting design can implement well-known data warehousing and loading patterns. Consistent with the present concepts, using a pattern-based generation approach can substantially reduce the effort and skills required to develop a complex data warehouse and can ensure consistent high quality. In some implementations, with well-chosen defaults, a few tens of lines of directives can automatically produce many thousands of lines of efficient code that embody best practices and would otherwise need to be manually written by hand.

In some implementations, the data warehouse design may be layered: loading tables may hold the incoming data temporarily; staging tables may be updated from the loading tables and may contain the current state of all source data; staging data may then be transformed and loaded into fact and dimension tables in the dimensional layer. The mapping to fact and dimension tables may be defined by the user in the directives. Transformations can include denormalization, aggregation, projection, filtering, and renaming of tables and columns. In some implementations, many data warehousing patterns may be supported including: star schemas, conformed dimensions, change tracking (slow changing dimensions), surrogate keys, date dimension, and/or time-of-day dimension. In some implementations, SQL procedures, together with transform views and intermediate tables, may be generated to transform the data between layers once it has been loaded using patterns optimized for the target data storage system (e.g., optimized for SQL DW). In other implementations, a mix of ADF for orchestration of the process and SQL may be used.

In addition to the DW, the system 100 can also generate parameters for creating a pipeline (e.g., a data factory pipeline) configured to copy data to the loading tables from the source and to trigger the transformation process once data has been loaded. In some implementations, the pipeline may be customized to load only the data required to support the DW design and transform data in the correct sequence.

In some implementations, the system 100 can also track and provide lineage information that shows the origin of every table and column in the dimensional layer. This information can be provided as a report and/or loaded to a catalog (such as Microsoft® Azure® Data Catalog, Oracle® Enterprise Metadata Management, and Amazon® Web Service Glue) to provide a searchable reference source, allowing users to track data lineage.

Figure 2:
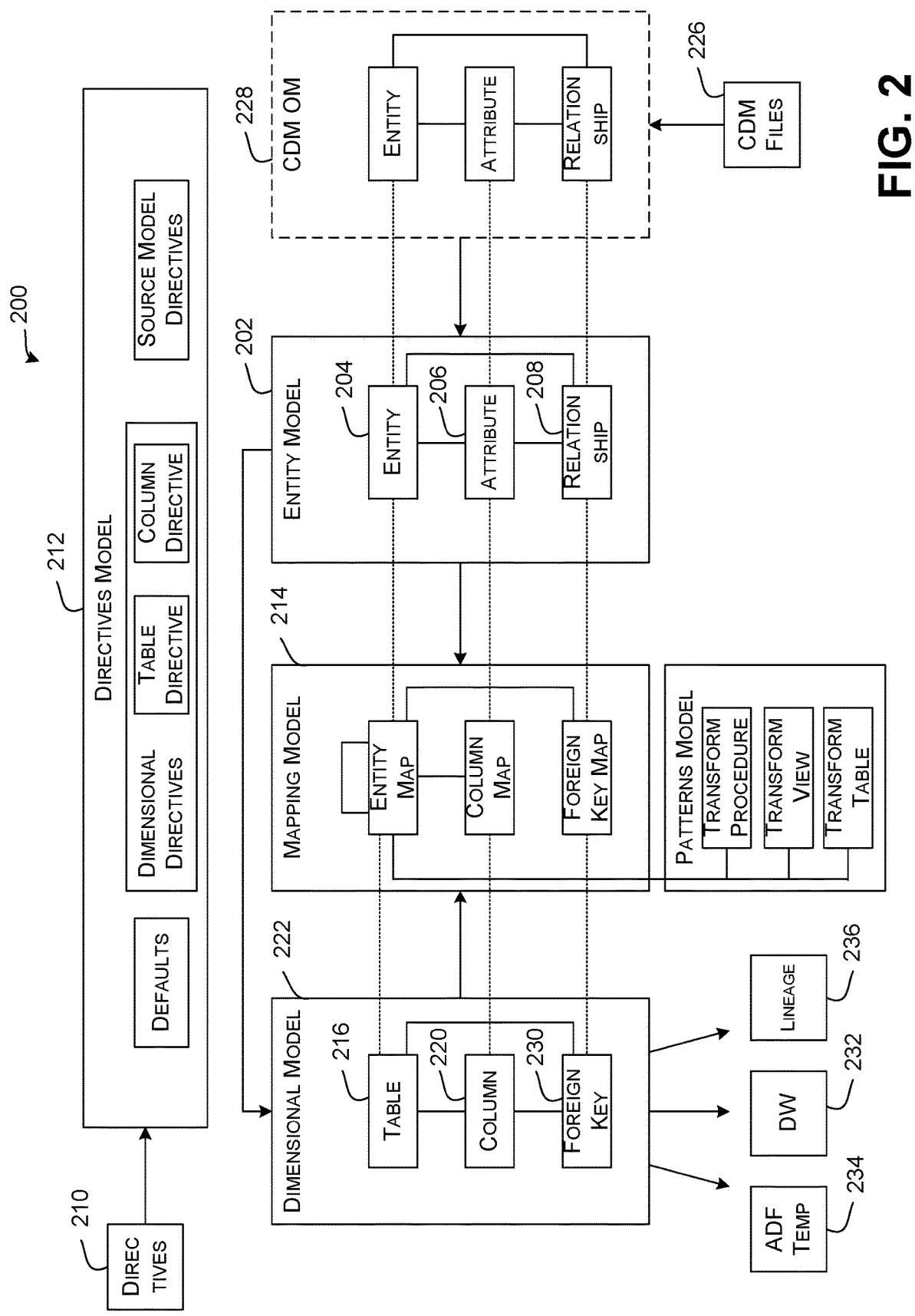
FIG. 2 is a functional block diagram that illustrates an example system for transforming data models, consistent with the present concepts.

FIG. 2 is a functional block diagram that illustrates an example system for transforming data models, consistent with the present concepts. The present concepts will be described using the example system in FIG. 2 in an example scenario of creating a data warehouse, but the present concepts may be applied to creating other target data models. Turning to FIG. 2, a system 200 for creating a data warehouse is illustrated. Referring to FIG. 2 with continued reference to FIG. 1, the system 100 and/or the system 200 can implement the following descriptions.

The schema and other metadata describing the input data may be first loaded to an entity model 202 (the source model, in this example) with entities 204 representing logical tables in the input data source, plus attributes 206 and relationships 208. Directives 210 for the design of the data warehouse may indicate how the data is to be transformed (e.g., reshaped through denormalization, aggregation, filtering, and/or renaming). The directives 210 may be processed to populate a directives model 212 and a fine grain mapping model 214, which may map every table 216 and column 220 in a dimensional model 222 to entities 204, attributes 206, and relationships 208 in the entity model 202, accounting for the transformations requested by the user. The present concepts—using the dimensional model 222, the mapping model 214, and the entity model 202—may establish the fundamental relationship between the target data structure (e.g., data warehouse design) and the source data structure. As discussed below, code generation is pattern-based, i.e., the user may select and configure which patterns should be used via the directives 210. Pattern-specific generator modules then navigate the three models 202, 214, 222 in order to generate SQL code.

In some implementations, the present concepts may allow the set of design and transformation patterns to be extended. New directives and/or new pattern modules can be added that provide different code templates that navigate the models as needed. In some implementations, only a single source model may be utilized. In other implementations, the present concepts can be extended to allow the data warehouse to be loaded from multiple data sources (e.g., potentially overlapping data sources). The mapping model 214 can be populated for each entity model 202 for generation, resulting in creation of discrete sets of loading and staging tables. At runtime, these discrete sets of tables can be loaded from each source and then processed collectively during transformation to load the single dimensional model 222. In some implementations, the present concepts can also be applied to other data warehouse design patterns, such as data vault modeling, or to generate other parts of the transformation pipeline, such as data preparation procedures where those can be driven by metadata provided in the entity model 202 and the directives 210.

In some implementations, the directives 210 may be user provided and supplied in JavaScript Object Notation ("JSON") format. In some implementations, a graphical user interface ("GUI") may be provided for creating and/or validating the directives 210 against the entity model 202 to improve the design process. An example GUI, consistent with the present concepts, will be described in reference to FIGS. 3-11.

FIGS. 3-11 are graphical user interfaces that illustrate an example process of transforming data models, consistent with the present concepts. FIGS. 3-11 illustrate an example user experience for creating and editing the directives 210 used for transforming one or more source data models (e.g., CDM models) to a target data model (e.g., a data warehouse). In this example, the designer may have in mind the schema she wants to create and knows where the source data is located. In this example, the source data may be a data lake in CDM Folders).

Figure 3:
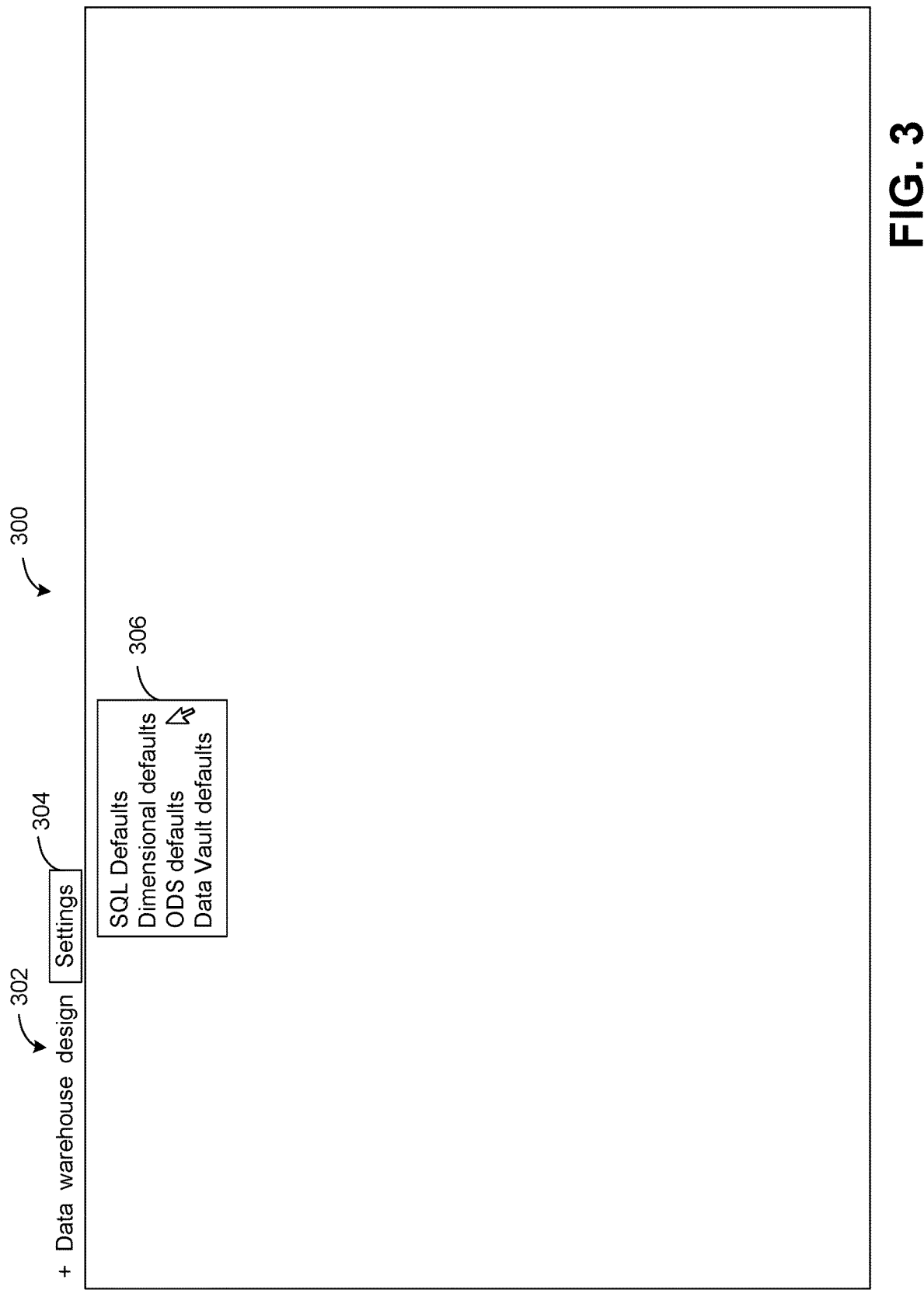

FIG. 3 illustrates a graphical user interface 300 ("GUI"), consistent with the present concepts. The GUI 300 may be provided by an application interface or a web interface presented by a browser. The GUI 300 may include a menu 302. In one implementation, the menu 302 may include a "Settings" menu item 304, which can be used to set defaults for directives. The "Settings" menu item 304 may include additional menu items for setting defaults for various types of target data models. For example, a "Dimensional defaults" menu item 306 may be selected to set dimensional modeling pattern defaults.

Figure 4:
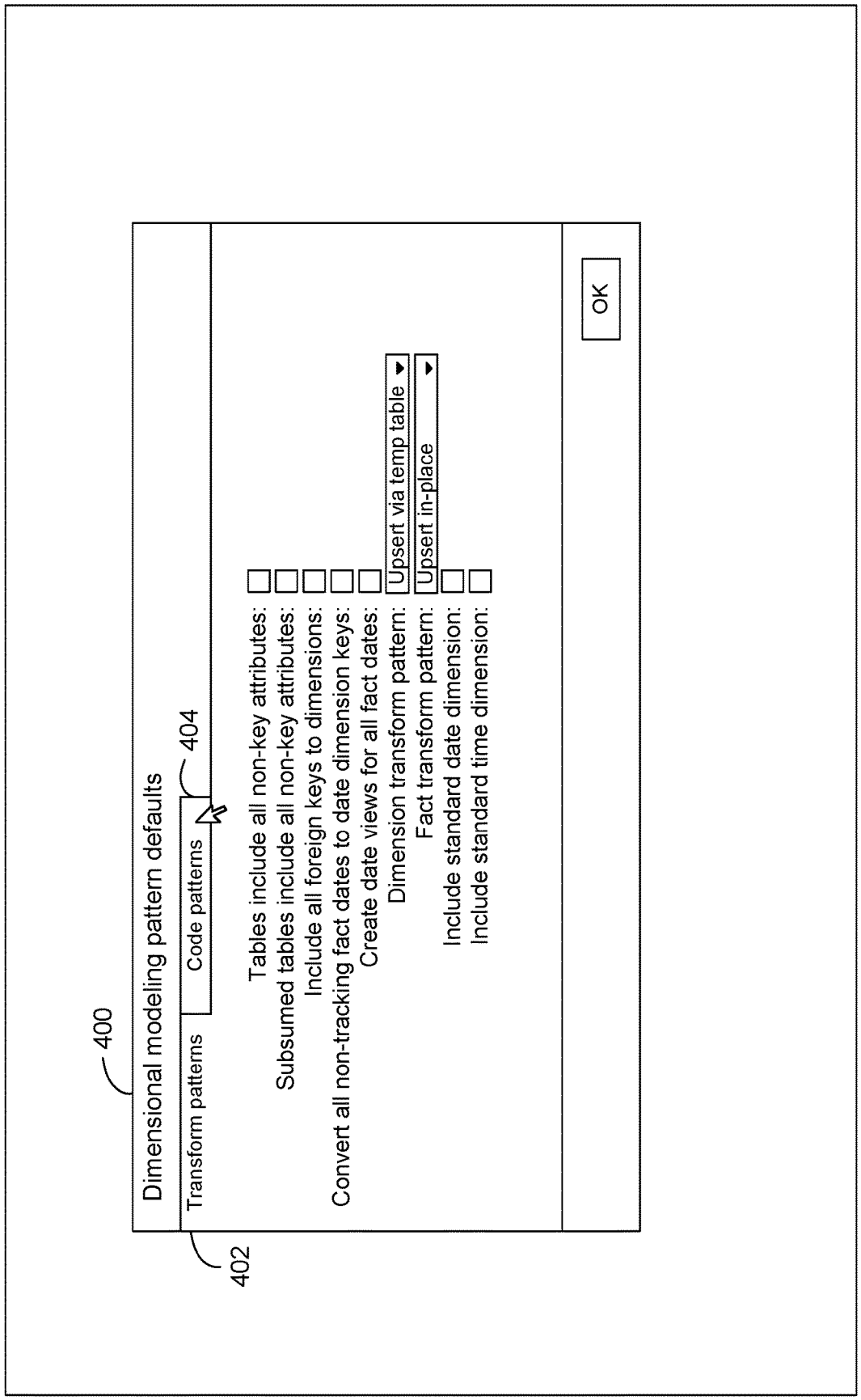

FIG. 4 shows a "Dimensional modeling pattern defaults" window 400 that may be presented in response to selecting the "Dimensional defaults" menu item 306 in FIG. 3 to allow the designer to set dimensional modeling pattern defaults for transformations. The "Dimensional modeling pattern defaults" window 400 may include a "Transform patterns" tab 402 and a "Code patterns" tab 404. For example, the "Transform patterns" tab 402 may allow the designer to decide what attributes to include in tables, choose whether to convert dates to date dimension keys, pick patterns from dropdown lists to use for ETL transformations, etc.

FIG. 5 shows the options available under the "Code patterns" tab 404. For example, the "Code patterns" tab 404 may include options for structuring code. This example illustrated in FIG. 5 may be for SQL language code. The "Code patterns" tab 404 includes various conventions for prefixes and suffixes in SQL language code that the designer may set and/or modify. Once the desired settings have been set or if the settings were previously set, the designer may select a "+Data warehouse design" menu item 502 to add a new data warehouse design using the settings set under the "Settings" menu item 302.

Figure 6:
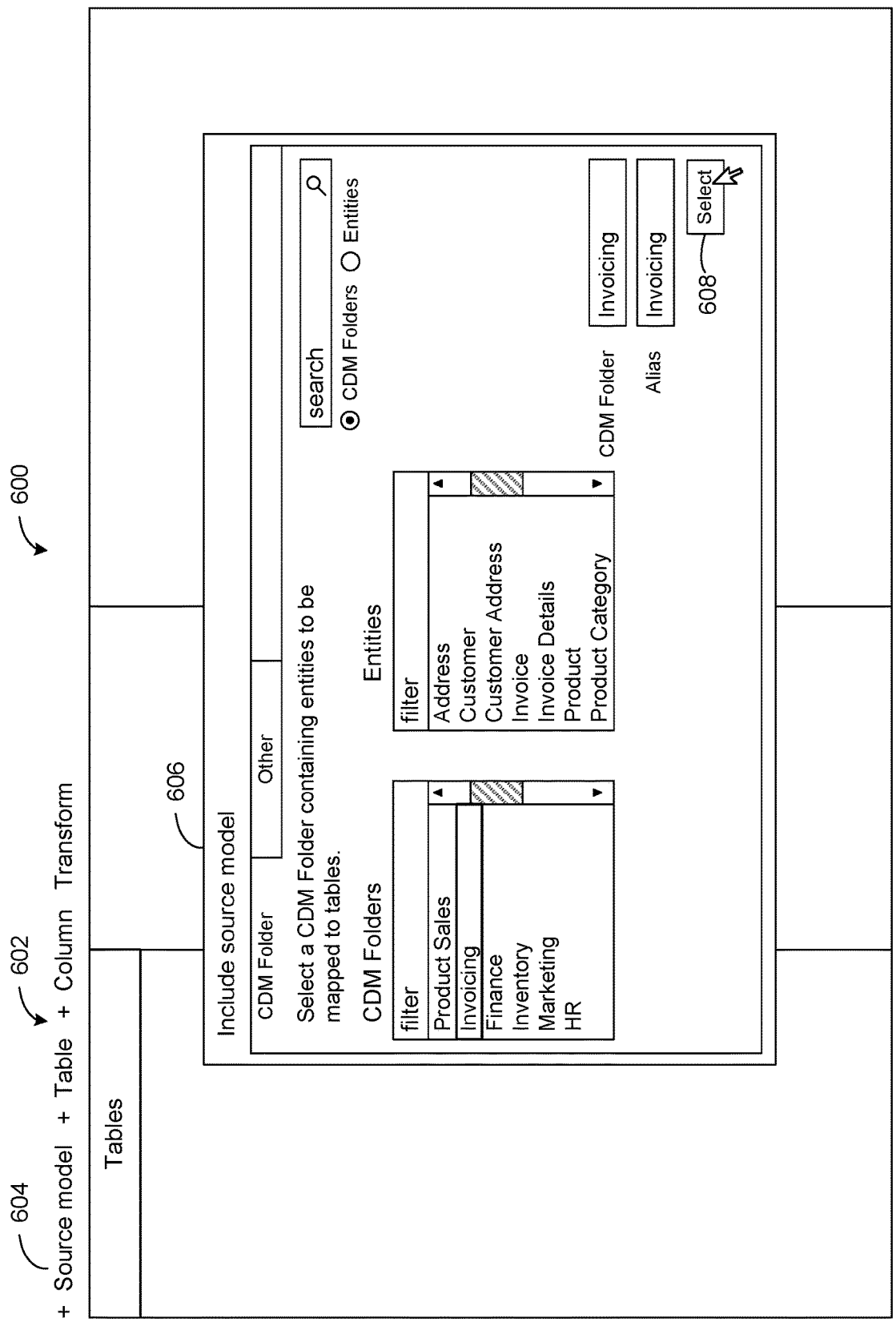

In one implementation, in response to the user selecting the "+Data warehouse design" menu item 502, the designer may be given an option to pick a type of pattern and/or name the new data warehouse, and then be presented with a GUI 600 in the background of FIG. 6 to allow the designer to create a new data warehouse design. The GUI 600 may include a menu 602. The menu 602 may include a "+Source model" menu item 604. If the designer clicks on the "+Source model" menu item 604 to include data from a source model, the designer may be presented with a "Include source model" window 606 shown in the foreground of FIG. 6. The "Include source model" window 606 may allow the designer to view and select one or more CDM Folders, from which data may be copied to the target data model. In this example, the designer may click on the "Invoicing" CDM Folder to display the various entities in the "Invoicing" CDM Folder, such as "Address," "Customer," "Invoice," and "Product" entities, for example.

Figure 7:
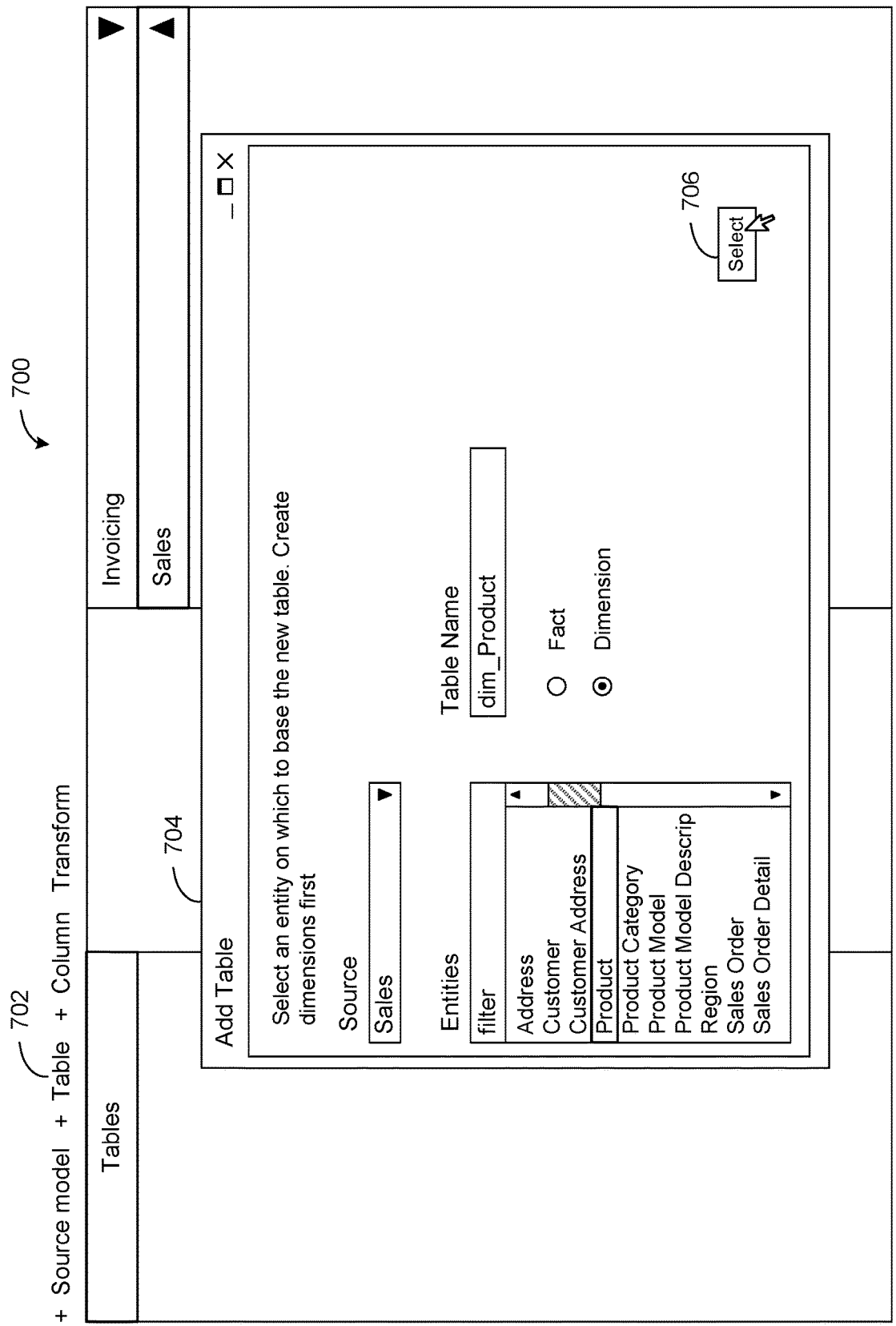

The designer may click on a "Select" button 608 to be returned to a GUI 700 shown in the background of FIG. 7 with the "Invoicing" CDM Folder shown on the right-hand side of the GUI 700. The designer may repeat the above process to add the "Product Sales" CDM Folder from the "Include source model" window 606 and be presented with the GUI 700 shown in the background of FIG. 7 with the "Invoicing" and "Sales" CDM Folders on the right-hand side of the GUI 700.

The present concepts may allow data from multiple source data models to be combined to create a target data model. For example, a conformed dimension table may source its data from multiple source data models or from multiple star schemas. For example, the "Invoicing" and "Sales" models may come from completely different sources, and the new tables in the target model can combine data from both sources.

Referring again to FIG. 7, the menu 602 may include a "+Table" menu item 702. In one implementation, the designer may click on the "+Table" menu item 702 to bring up a "Add Table" window 704 for adding a new table in the target data model. In the "Add Table" window 704, the designer can choose any of the sources that were previously added, i.e., the "Invoicing" and "Sales" sources. Selecting one of the sources may reveal the entities in the selected source. In the example illustrated in FIG. 7, selecting the "Sales" source has revealed the entities therein: "Address," "Customer," "Product," "Region," "Sales Order," etc. The designer may select one of the entities and choose whether to create a fact table or a dimension table. In the example illustrated in FIG. 7, the designer has selected the "Product" entity in the "Sales" source, and has chosen to create a dimension table. In one example implementation, the new table name may default to be "dim_Product" using the dimension table prefix "dim_" that was set in the "Code patterns" tab 404 shown in FIG. 5. The default name may be modified by the designer. In some implementations, the choice between fact table or dimension table may be automatically determined using rule-based and/or machine learning-based algorithms to set the table type for the designer and/or to make a pre-selected default suggestion to the designer.

Figure 8:
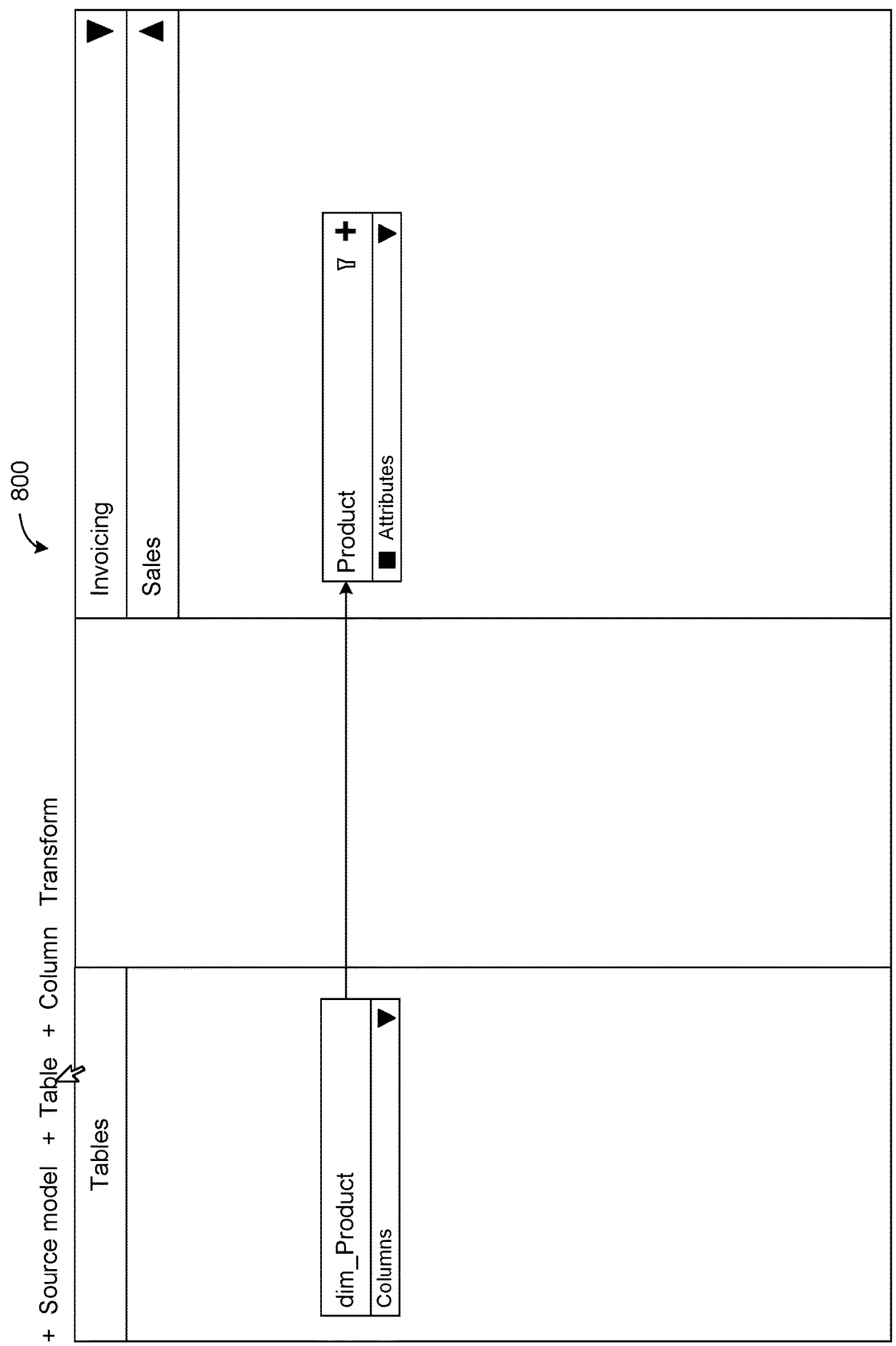

Clicking on a "Select" button 706 may add a dimension table named "dim_Product" to the target data model and bring up a GUI 800 shown in FIG. 8 that includes a graphical representation of a mapping for a new dimension table called "dim_Product" in the target data model from the "Product" entity in the source data model. The GUI 800 in FIG. 8 may illustrate the design of the target data model on the left side as well as the transformation that will be made with respect to the source data model depicted on the right side when the target data model is created. In this example shown in FIG. 8, the left side of the GUI 800 may show the structures of the target data model (which includes the "dim_Product" dimension table) and the right side may show the entities in the source data models (which include the "Product" entity from the "Sales" source). The connection lines between the left side and the right side may represent mappings, transformations, and/or lineage information in a visual graphical form.

Figure 9:
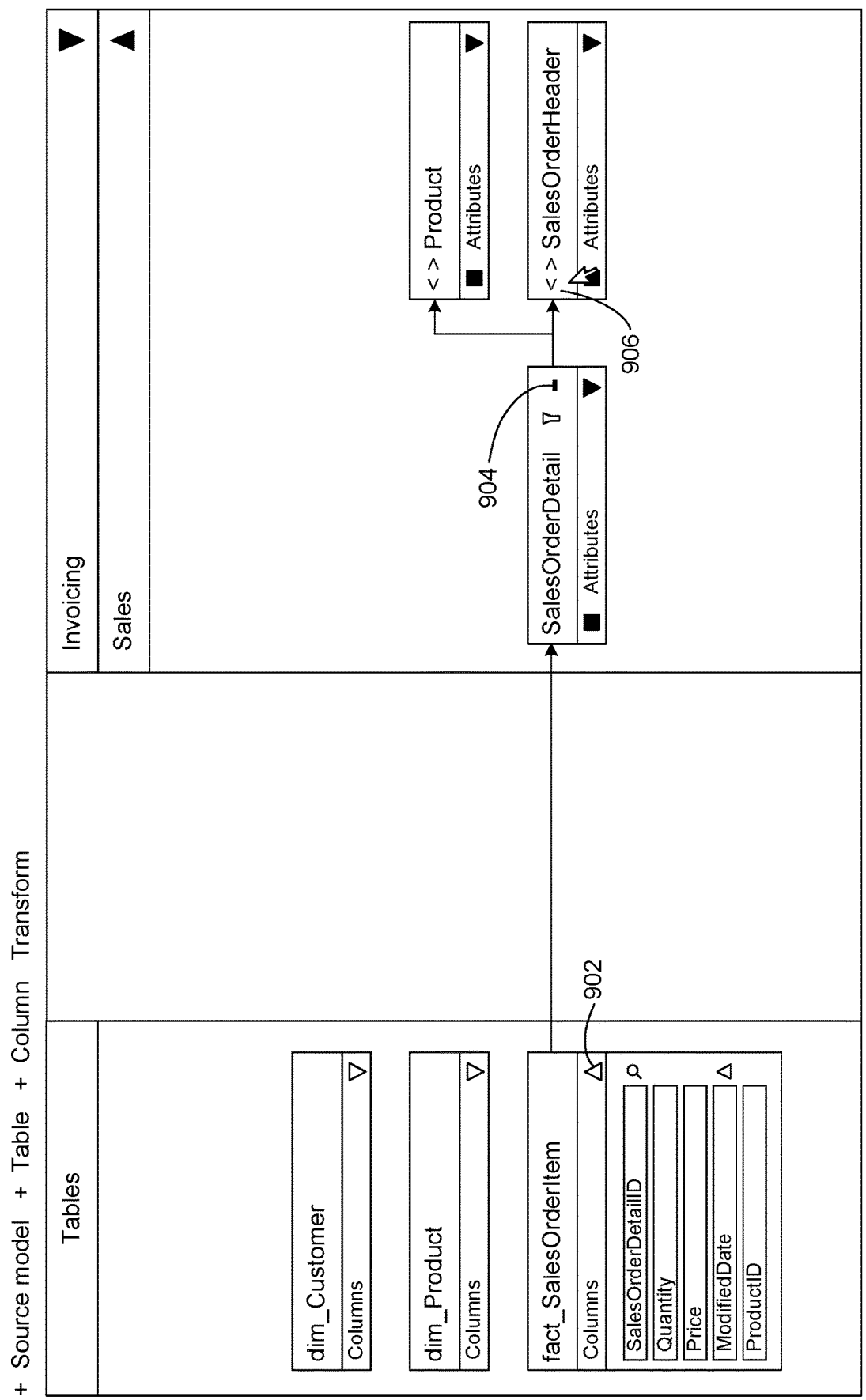

The above-described process can be repeated or followed by the designer to create multiple new tables (fact tables and/or dimension tables) in the target data model to create mappings. For example, as illustrated in FIG. 9, the designer may add another new dimension table called "dim_Customer" from the "Customer" entity in the "Sales" source and add a new fact table called "fact_SalesOrderItem" from the "Sales Order Detail" entity in the "Sales" source.

In one implementation, clicking on an arrow 902 in a new table in the target data model may reveal and hide the columns in the new table. For example, the "fact_SalesOrderItem" fact table may include columns "SalesOrderDetailID," "Quantity," "Price," "ModifiedDate," and "ProductID." The new tables in the target may already include pre-defined columns based on the content of the corresponding entity in the source.

In one implementation, clicking on the plus (+) or minus (−) sign 904 in the source entity may reveal and hide related entities. For example, clicking on the plus sign 904 for the "SalesOrderDetail" entity may reveal the related entities "Product" and "SalesOrderHeader."

Figure 10:
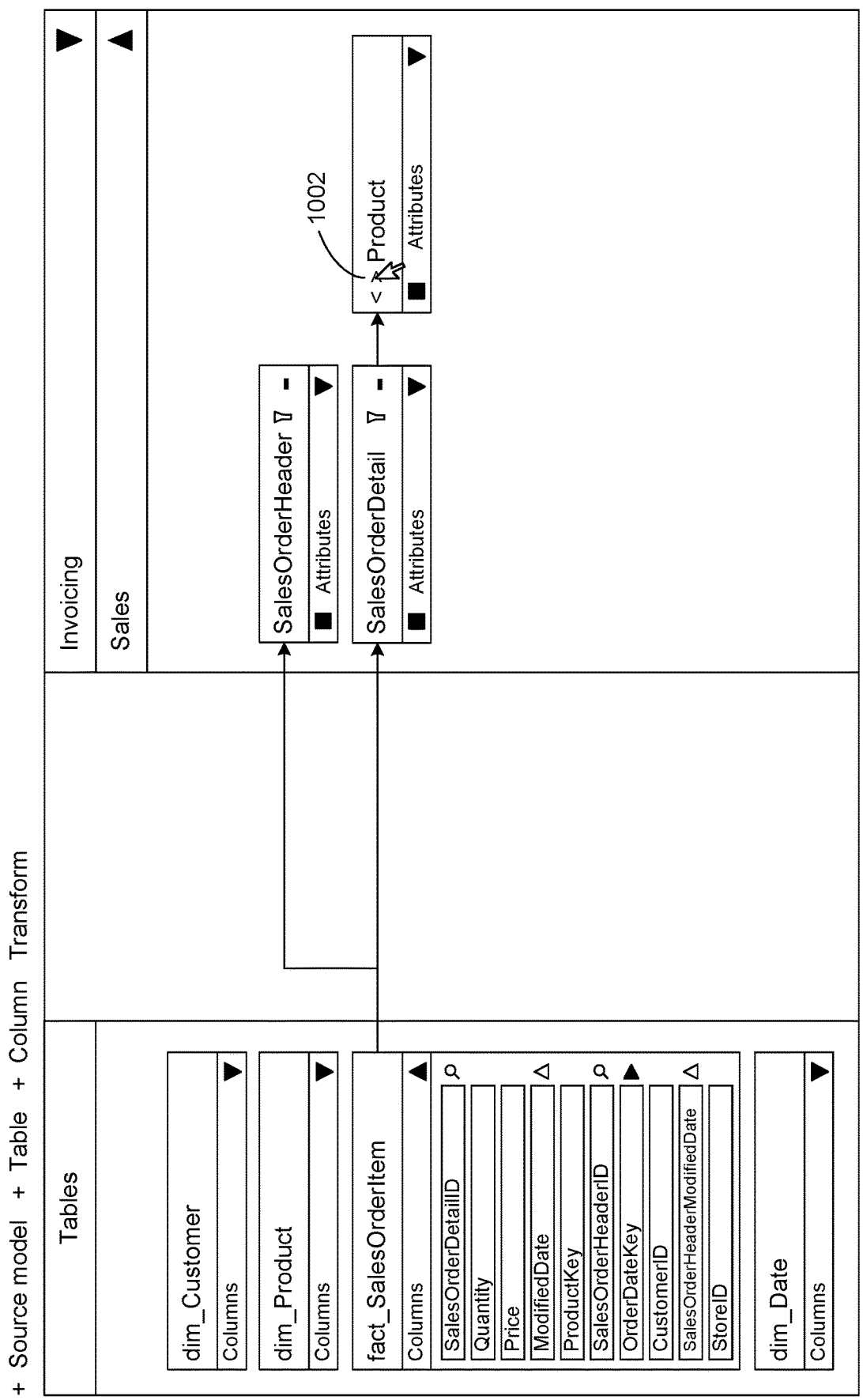

In one implementation, clicking on a left arrow 906 on the related entity may denormalize it. For example, clicking on the left arrow 906 of the "SalesOrderHeader" entity in FIG. 9 may denormalize the "SalesOrderHeader" entity as shown in FIG. 10, and thus additional columns have been automatically added to the "fact_SalesOrderItem" fact table in the target data model based on the contents of the "SalesOrderHeader" entity, as shown in FIG. 10. Furthermore, in some implementations, because the "SalesOrderHeader" entity includes a date attribute, a "dim_Date" dimension table has been automatically added to the target data model, and a new column "OrderDateKey" has been automatically added to the "fact_SalesOrderItem" fact table, as shown in FIG. 10.

Conversely, clicking on a right arrow 1002 on a related entity may keep it as a related entity. For example, as shown in FIG. 10, clicking on the right arrow 1002 on the "Product" related entity may keep it as an entity related to the "SalesOrderDetail" entity rather than denormalizing it.

Figure 11:
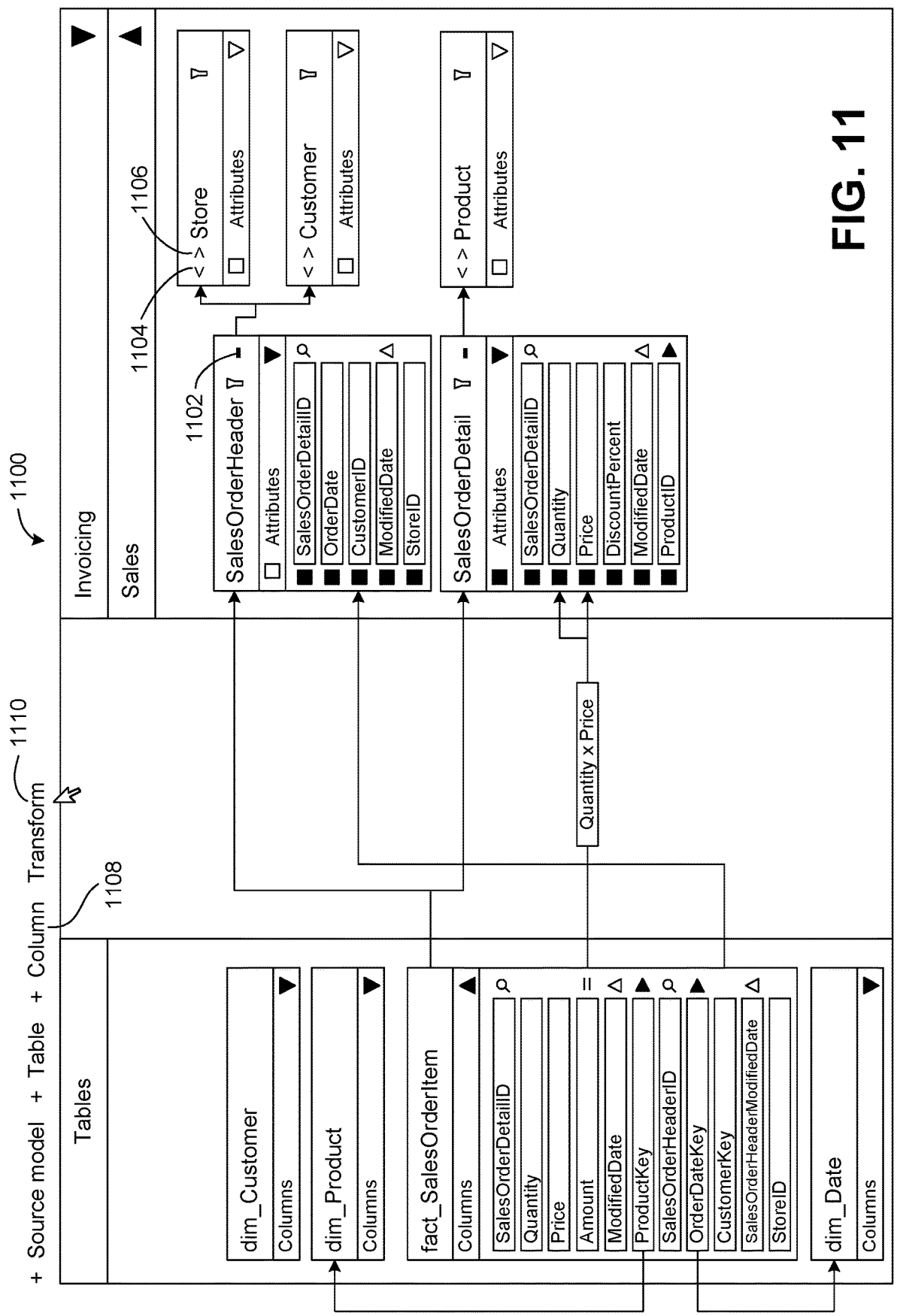

Referring to FIG. 11, the designer can continue to operate on the source model using a GUI 1100 to define the design of the target data model by defining mappings for transforming the data from the source data model to the target data model. For example, the designer may click on a plus/minus sign 1102 in the "SalesOrderHeader" entity to reveal two related entities "Store" and "Customer." This action may present a left arrow 1104 and a right arrow 1106 for the two related entities, so that the designer is provided with the option to denormalize them or keep them as related entities. This process of graphically declaring the mappings and transformations between the source data model and the target data model may be performed by the designer until she is satisfied that the entire schema that she had in mind is fully represented graphically in GUI 1100.

In one implementation, clicking on a column in a new table may reveal a link to another table. For example, a link may be graphically shown between the "ProductKey" column in the "fact_SalesOrderItem" fact table to the "dim_Product" dimension table. As another example, a link may be shown between the "OrderDateKey" column in the "fact_SalesOrderItem" fact table to the "dim_Date" dimension table.

The GUI 1100 may also show lineage information. For example, the "CustomerKey" column in the "fact_SalesOrderItem" fact table can be shown to have lineage from the "CustomerID" attribute in the "SalesOrderHeader" entity, and the "fact_SalesOrderItem" fact table can be shown to have lineage from the "SalesOrderHeader" and "SalesOrderDetail" entities.

In some implementations, the designer can click on a "+Column" menu item 1108 to add a new column to a new table in the target data model, and the designer may be given the option to name the new column and to describe a derivation on how the data in the new column may be derived. For example, as shown in FIG. 11, a new column "Amount" can be added to the "fact_SalesOrderItem" fact table which aggregates the "Quantity" and "Price" attributes from the "SalesOrderDetail" entity by taking their product (i.e., multiplication).

The GUIs shown in FIGS. 3-11 are provided as an illustration of example implementations. Many of the described and illustrated features may be implemented in different ways. For example, in an alternative implementation, the tables of the target data model displayed on the left side the GUIs may be illustrated in graphical diagram form showing the relationships among the tables.

The layouts of the tables and entities shown in FIGS. 3-11 may be designed such that the designer need not spend time laying out tables or entities in some preferred arrangement but rather can focus on the process of mapping data to create the design of the target data model. Accordingly, in some implementations, the GUIs may automatically position the objects (i.e., tables, entities, links, etc.). In alternative implementations, the designer may be presented with or be allowed to manage various 2-dimensional ("2D") or 3-dimensional ("3D") arrangements of the objects. For example, a 2D graph arrangement may allow the designer to better visualize the "star" patterns in the data warehouse schema where fact tables are surrounded by dimension tables.

As illustrated above, the present concepts may enable the designer to use a GUI to define directives rather than manually typing the directives code. Therefore, a designer who does not have a high-level of software programming proficiency can design a target data model more intuitively and conceptually using graphical representations of the target data model schema and graphical representations of mappings between the source data model and the target data model. Furthermore, the graphical representations displayed in the GUI make it easier for the designer and others to easily understand and change the design. These improved techniques can also save time and money associated with transforming data models. The GUI also makes debugging or finding errors easier since the design can be viewed graphically rather than forcing the designer to dig through voluminous lines of code. To further assist the designer, the GUI may highlight errors on the diagram and may also provide corresponding error messages. In some implementations, the designer may be prevented from introducing errors that might occur had the directives been written manually.

At the end of this process, the designer may click on a "Transform" menu item 1110 to automatically generate the directives code, automatically generate the SQL code for creating the target data model, and automatically generate the ETL code for transferring data form the source to the target. In some implementations, one or more of the directives may be provided and/or recommended through machine learning algorithms based on the structure, semantics, and/or statistics associated with the source schema and inferred using common data usage and reporting patterns.

Consistent with the present concepts, the creation of an intermediate, fine-grained, and tightly-coupled set of models that describe the source, the target, and the mappings between them may allow the generation of complex, multi-step transform procedures that can be separated from the process of designing the target schema. As a result, alternative transform patterns can be introduced and composed to generate transformation procedures optimized for different loading scenarios without changing the way the design is modeled internally.

Exemplary Transformation Process

Referring again to FIG. 2, the transformation process can be broken into stages. First, the directives file 210 may be parsed, and the directives model 212 may be loaded. Based on the source model location in the directives 210, a source model may be identified (e.g., a CDM file 226 may be parsed using an CDM object model 228) and the entity model 202 may be loaded, and various naming transformations or normalizations may be performed.

Based on the dimensional directives 210, which can describe the table-to-entity mappings, the tables 216 may be created and the mappings defined between the entities 204 and the tables 216, the attributes 206 and the columns 220, and the relationships 208 and the foreign keys 230, etc. Denormalization and aggregation may be performed by creating multiple related entity maps.

A data warehouse 232 may be generated by processing the tables 216 in the dimensional model 222 to create the dimensional tables by navigating the mapping model 214 to create the staging tables (e.g., one per entity map) and by processing the transform patterns to create the transform procedures, intermediate views, and transform tables. In some implementations, other artifacts may also be created by processing the models—ADF templates 234 and/or a lineage report 236. In some implementations, SQL generation may be driven from the dimensional model 222 and the SQL-related objects it contains may implement a GetSQL( ) method or SQL property which computes and returns the SQL for that object, retrieving and combining the SQL from lower level objects as necessary.

The system 200 thus can generate code based on specific set of patterns, guided by the directives 210. For purposes of explanation and not limitation, one or more of the following aspects of transformation may be provided by the present concepts.

A single dimensional DW model may be created from entities in a single source entity model.

Tables may be specified, and each table may be based on a single "base" entity.

Tables may be specified as either a fact or a dimension.

Each table definition can be extended by, for example:

Denormalization: Additional related entities can be identified from which data can be denormalized (by identifying the related entity via a path from the base entity that follows foreign keys, i.e., m:1 or 1:1)

Aggregation: Additional related entities can be identified from which data can be aggregated (the related entity may have a foreign key path towards the base entity).

A pre-populated standard date dimension table can be generated. The date portion of all dates can be substituted for a reference to the date dimension.

A standard time-of-day dimension can be provided with a meaningful surrogate key. The time portion of dates can be extracted to reference the time-of-day dimension.

Surrogate keys may be used for all dimensions with an integer key added using, for example, SQL Identity when a row is first added.

Relationships may be supported from fact or dimension tables to dimension tables. Relationships may be based on the target dimension's surrogate key. Surrogate key values may be substituted as foreign keys when data is loaded based on the natural key in the dimension.

All relationships are optional. Foreign key constraints need not be implemented, allowing load flexibility. Alternatively, relationships may be annotated as mandatory. Thus, it may be possible to identify where relationship information is incorrectly captured in the data, and errors can be reported. These errors can be addressed, and the affected data may be reloaded.

Involuted relationships may be supported.

All entity attributes can be included by default but can be excluded individually. Alternatively, all attributes can be excluded by default but can be included individually. These alternatives and individual attributes may be configurable per entity.

Table names and column names may be based on entity names and attribute names, respectively, but can be overridden and edited.

Standard prefixes and/or suffixes for fact and dimension tables, views, and procedures can be specified.

Name case can be modified to upper, lower, or Pascal case. Optional separators can be used.

Datatypes may be mapped from types used in the source system to types used in the target system. These mappings can be defaulted and overridden in the directives. In some implementations, column datatypes may be based on a mapping, for example, from CDM to SQL datatypes. The mapping can be specified in the directives.

String datatypes may be converted to a variable length datatype by default, with the length determined by metadata in the source model if available, for example, the CDM maximum length property.

Datatypes of individual columns can be overridden as needed.

In a pattern in which data is staged in the target data storage system before being incorporated, staging tables may be created for every source entity included in the entity-table mapping.

In some implementations, SQL schema names can be specified for staging tables, temporary tables, dimensional tables, expired tables, and views. A single database schema may be used by default.

A set of common transformation procedure patterns may be supported to transform the staged data and populate the dimensional tables.

Data may be updated in the dimensional tables based on a specified change-tracking attribute in each table.

Changes to dimension values can be tracked using slowly changing dimension ("SCD") and/or history tracking patterns.

SCD type 1: keep latest version only.

SCD type 2: add a new row and close off existing row with an end date.

Other SCD pattern may be supported, including combinations of patterns.

SCD patterns can be set per attribute or per entity with some restrictions.

Index option: In some implementations, the target data storage system may offer options for how table data is indexed and organized, for example, whether indexed and organized as a row store or a column store. In some implementations, with the target data model being SQL DW, indexing may default to clustered columnstore with an option to use heap or clustered index.

Distribution: In some implementations, the target data storage system may offer options for data distribution across nodes. In some implementations, distribution may default to round robin with an option to set hash distribution or replicated.

Transformation patterns may determine how data is transformed from source to target and may reflect common best practices for such transformation for specific source and target data storage systems. For example, when transforming to a SQL-based target data warehouse, this can include copying source entity data to staging tables and utilizing CREATE TABLE AS SELECT ("CTAS") statements for performance. Two supported patterns may include:

UpsertViaTempTable may merge incoming data with existing data in a temporary table and then rapidly switch the temporary table for the existing table, for example, by renaming the existing table and temporary table, or by changing a view definition to refer to the temporary table in place of the existing table.

UpsertInPlace may merge data directly in the target dimensional table

Patterns may use transform views that manifest the result of denormalization and aggregation over the staging tables.

Exemplary Directives

For purposes of explanation and not limitation, exemplary directives are set forth in Table 1 below:

TABLE 1

| Directive | Values | Purpose | Comments |
|---|---|---|---|
| {  |  |  |  |
| Name | Text | Name for the set of directives | Informational only |
| Description | Text | Description | Informational only |
| Version | Text, e.g., "1.0" | Version number | Informational only |
| sqlTableNamingCase | "none\|upper\|lower\|pascal" | Adjusts naming case | Requires entity names are space separated |
| sqlColumnNamingCase | "none\|upper\|lower\|pascal" | Adjusts naming case | Requires attribute names are space separated |
| sqlobjectNamingSeparator | Text, e.g., "-" | Character to use as name separator | Requires entity/attribute names are space separated |
| cdmDataType | Text, e.g., "string" |  | Datatype used in the source CDM |
| sqlDataType | Text, e.g., "nvarchar" |  | Datatype used in generated SQL |
| Length | Number, e.g., 512 | Length/precision for decimal | Default value, used for string and decimal only |
| Scale | Number, e.g., 4 | Scale for decimal | Default value, decimal only |
| }] |  |  |  |
| } |  |  |  |
| DimensionalModelDefaults |  |  |  |
| { |  |  |  |
| factTablePrefix | Text, e.g., "fact" | Optional | Normally use prefix or suffix |
| factTableSuffix | Text, e.g., "fact" | Optional |  |
| dimensionTablePrefix | Text, e.g., "dim" | Optional | Normally use prefix or suffix |
| dimensionTableSuffix | Text, e.g., "dim" | Optional |  |
| surrogateKeyNameSuffix | Text, e.g., "Key" | Optional | Recommended |
| surrogateKeyType | "int" | Required Datatype of SK |  |
| surrogateKeyMechanism | "identity (1, 1))" | Required |  |
| primaryKeySuffix | Text, e.g., "PK" | Optional | Used on the columns marked as primary/natural key in CDM |
| foreignKeySuffix | Text, e.g., "FK" | Optional |  |
| dateKeySuffix | Text, e.g., "date" | Optional | Used as suffix on FKs to the Date dimension |

TABLE 1-continued

| Directive | Values | Purpose | Comments |
|---|---|---|---|
| transformProcedurePrefix | Text, e.g., "usp" | Optional | Defaults to "usp" |
| transformProcedureNameStem | Text, e.g., "Transform" | Optional | Procedure name = <prefix><stem><table>. Defaults to "Transform" |
| transformViewPrefix | Text, e.g., "tv" | Optional | Default is "tv" |
| transformTablePrefix | Text, e.g., "tt" | Optional | Default is "tt" |
| transformtableViewPrefix | Text, e.g., "ttv" | Optional | Default is "ttv" |
| dimensionalViewPrefix | Text, e.g., "v" | Optional | Default is "v" |
| dimensionalTablePrefix | Text, e.g., "" | Optional | Default is nothing "" or the fact or dimension prefix if provided. |
| } | | | |
| cdmDefaults { | | | |
| cdmRoot | Text, e.g., "c:\\temp\\cdm\\" | Required | Location of core/foundational CDM definitions |
| } | | | |
| sourceModelDefaults { | | | |
| generateStagingTables | Bool | Optional | Defaults to true |
| Schema | Text, e.g., "stage" | Optional | Defaults to dbo if not specified or overridden at model level. Not yet supported in ADF copy pipeline, must use dbo |
| generateAdfTemplate | Bool | | Causes ADF template to be generated |
| adfFactoryName | Text, e.g., "MyFactory" | Required | Required if generating ADF template parms |
| cdmParserUrl | Text, e.g., "https://<parserApp>.azurewebsites.net/api/parse" | Required | Required if generating ADF template parms |
| adlsGen2Url | Text, e.g., "https://<account>.dfs.core.windows.net | Required | |
| adlsGen2AccountKey | Text | | |
| storageConnectionString | Text | Required | Blob storage; used by ADF for staging |
| sqlDwConnectionString | Text | Required | |
| batchInitialization | "truncate\|drop" | | ADF pipeline code always uses truncate so this is not implemented at this time. |
| } | | | |
| sourceModels[{ | | | |
| cdmFolder | Text, e.g., "powerbi/my folder" | Optional | Name of CDM folder in ADLS used by ADF |
| cdmFolderModelName | Text, e.g., "model.json" | Optional | Name of model.json file in the source CDM folder. Used for ADF pipeline generation |
| LocalFolioLocation | Text, e.g., "c:\\temp\\entities" | Optional | Location of folio and entities |
| localFolioName | Text, e.g., "myFolio.folio.cdm.json" | Optional | Name of local folio file that lists entities to process |
| localModelLocation | Text, e.g. "C:\\temp\\model\\" | Optional | Location of local source model.json. |
| localModelName | Text, e.g., "model.json" | Optional | Name of model.json file used as input. |
| Alias | Text, e.g., "Retail" | Required | Short distinct name for the model. Used as prefix for output. |
| changeIndicatorAttribute | Text, e.g., "lastModifiedDate" | Optional, overrides source default | Used to determine if a row has changed |
| EffectiveDataAttribute | Text, e.g., "lastModifiedDate"" | Required | Enables slow changing dimension #2 tracking |
| Entities [{ | | | Augments definition in model.json/entity.cdm.json |
| Name | Text, e.g., "Product" | Name of entity | Use valid SQL object chars |
| PrimaryKeyAttributes[ | | | Required if natural key is not specified in entity definition |
| <value> | "<attributename>", "ProductID" | Name of key attribute | Supports multi-part keys. Required |
| ] | | | |
| changeIndicatorAttribute | "<attributeName>", e.g., "lastModifiedDate" | Optional, overrides model | Used to determine if a row has changed |

TABLE 1-continued

| Directive | Values | Purpose | Comments |
|---|---|---|---|
| effectiveDateAttribute }] Relationships [{ | "<attributeName>", e.g., "lastModifiedDate" | Optional, overrides source default | Enables slow changing dimension #2 tracking |
| Name | Text, "Person attends Class" | Informational only | Optional |
| source{ Entity | Text, e.g., "Person" | Name of source entity | Will have the foreign key attributes |
| role (was alias) | Text, e.g., "Student" | Optional role name for source entity in this relationship | Required to make entity name unique for multiple relationships between the same pair of entities |
| Multiplicity } target{ | "many"|"one" | | Should be "many" |
| entity | Text, e.g., "Class" | Name of target entity | Will have the primary key |
| role (was alias) | Text, e.g., "AttendedClass" | Optional role name for target entity in this relationship | Required to make entity name unique for multiple relationships between the same pair of entities |
| multiplicity } joinPairs [{ | Text, "one" | | Should always be "one" |
| sourceAttribute | Text, e.g., "attendedClassID" | | May often be role name based |
| targetAttribute }] } ] | Text, e.g., "ClassID" | | |
| name | Text, e.g., "retail" | The name of the dimensional model | Used to name the generated DDL for the DW |
| tablesIncludeAllAttributes | Bool | Indicates if all attributes mapped unless overridden | Default=true. If false, tables still have some essential attributes mapped |
| tablesIncludeAll denormalizedAttributes | Bool | Indicates if all denormalized table attributes included | Default=true. If false, some essential attributes still included |
| includeAllForeignKeysTo Dimensions | Bool | Indicates if all relationships to dimension entities are implemented | Default=true. |
| includeAllDenormalized ForeignKeysToDimensions | Bool | Indicates if relationships from denormalized entities are implemented | Default=true |
| convertAllFactDatesToDate DimensionKeys | Bool | All dates on facts are converted to links to the date dimension | Default=true |
| createDateViewsForAllFact Dates | Bool | Not implemented | |
| dimensionTransformPattern | "<pattern>" | The default pattern used to load and transform dimensions. | Required |
| factTransformPattern | "<pattern>" | The default pattern used to load and transform fact tables. | Required |
| standardDimensions [{ dimension | "date"|"timeofday" | The standard dimension to be included. | If a custom dimension is used it must use a simple smart (date/time based) integer primary key. |
| Name }] Tables [{ | "<dimension Name>" | The name to be used in the generated DDL | |
| ignore | Bool | If true, the table is not included in DDL | Useful for temporarily ignoring a table while testing or doing an A|B comparison |
| type | "Dimension"|"fact" | Required | |
| modelAlias | "<aliasName>" | Optional | Required to disambiguate entity names from multiple models |
| entity | "<entityName>" | The base entity for the table | Required. |
| schema | "<schemaName>" | Name of the containing schema | Optional. Overrides default for dimensional tables |

TABLE 1-continued

| Directive | Values | Purpose | Comments |
|---|---|---|---|
| tableName | "<tableName>" | Name for the table | Optional. By default, table name is based on entity name |
| where | "<SQL expression>" | SQL expression that filters rows in the entity staging table | Optional, can be any valid SQL expression; is injected as-is to the transform view. |
| transformPattern | "<patternName>" | Name of pattern to be used. | Optional, overrides default pattern for this table type |
| trackChanges | "none"|"type1"|"type2" | Slow changing dimension type | Optional. Dimensions only. Default is type1 (overwrite with latest value). |
| distribution | "hash"|"roundrobin"|"replicate" | | Default= "roundrobin" |
| hashColumn | "<columnName>" | | Required if hash distribution is specified |
| tableStructure | "clusteredColumnstore|clusteredindex|heap" | | Default = "ClusteredColumnStore" |
| indexColumns [ | | Required for clusteredIndex | Only required for clusteredColumnstore in order to specify order |
| column | "<columnName>" | | |
| direction | "asc|desc" | | Default = "asc". Direction cannot be "desc" for clusteredColumstore |
| ] | | | |
| nonClusteredIndexes [ | | | |
| indexName | "<indexName>" | | |
| IndexColumns [ | | | |
| column | <columnName>" | | |
| direction | "asc|desc" | | Default = "asc" |
| ] | | | |
| ] | | | |
| Partition { | | | |
| column | | | |
| range | | | |
| values[ | | | |
| <value> | "<value>" | | |
| ] | | | |
| } | | | |
| denormalizedEntities [{ | | | |
| path | "<pathExpression>" | Dotted path from base entity to denormalized entity | Use aliases if provided. Essential if multiple paths to the target exist. |
| columnPrefix | "<prefix>" | Prefix to use on denormalized columns | Required to disambiguate column names from the denormalized entity. |
| includeAllAttributes | Bool | Includes all attributes | Overrides table level default |
| includeForeignKeysTo Dimensions | Bool | Includes foreign keys to dimension tables | Overrides table level default |
| relatedEntities [{ | | | |
| path | Text, e.g., "foo.bar" | Path expression to the related table. | Use aliases to disambiguate path |
| foreignkeyColumn | Text | | |
| trackChanges | Text, "none"|"type1"|"type2" | Slow changing dimension type | |
| table | Text, "<tableName>" | Specifies the related table | |
| exclude | Bool | If true, excludes the table | Use to exclude a specific relationship |
| }] | | | |
| columns [{ | | | |
| source | Text, "<sourceExpression>" | Identifies the source of column | Required. Can be an attribute, a path and an attribute or a derivation expression. Derivation expression not yet supported |
| columnName | Text, "<columnName>" | Overrides a default columnName | Optional. Required for derived columns |
| datatype | Text, e.g., "nvarchar(50)" | Overrides the default datatype | |

TABLE 1-continued

| Directive | Values | Purpose | Comments |
| --- | --- | --- | --- |
| isChangeIndicator | Bool | If true, sets this as a change indicator column. Ignored if false. | Adds to any global setting |
| createDateView convertToDateDimensionKey | Bool | Converts a date to a reference to the date dimension | Overrides table or global default setting |
| exclude | Bool | Excludes the column | Used to exclude an automatically included column |

```
}]
]
```

An exemplary transform directive is set forth in Table 2 below:

TABLE 2

```
"tables": [
    {
        "type": "fact",
        "entity": "SalesOrderDetail",
        "denormalizedEntities": [
            {
                "path": "SalesOrderHeader"
            }
        ]
    },
    {
        "type": "dimension",
        "entity": "Product"
    },
    {
        "type": "dimension",
        "entity": "Customer"
    }
]
```

Transform Patterns

Figure 12:
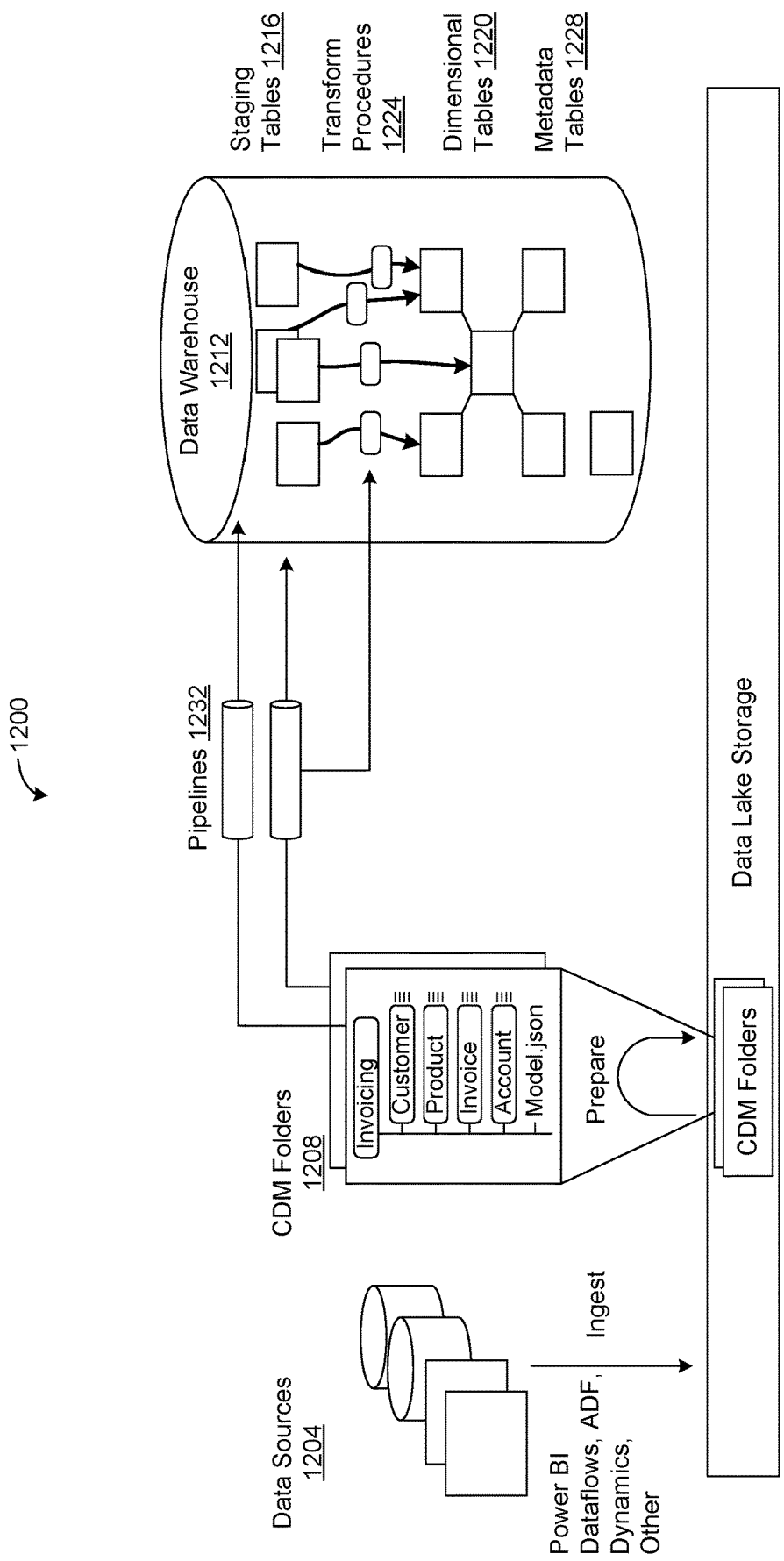
FIG. 12 is a functional block diagram that illustrates an example system for transforming data models, consistent with the present concepts.

FIG. 12 is a functional block diagram that illustrates an example system for transforming data models, consistent with the present concepts. Referring to FIG. 12, a diagram of a system 1200 for loading a data warehouse is illustrated. The system 1200 may include data sources 1204, which can optionally be transformed into a CDM format having CDM folders 1208. A data warehouse 1212 may use staging tables 1216 with dimensional tables 1220 loaded by transform procedures 1224 that handle surrogate key substitution, slowly changing dimensions, etc. Metadata tables 1228 can include CDM refresh data which, when more recent than that recorded by a pipeline 1232 on a prior load, can signal that data for an entity is to be loaded to the staging tables 1216. The pipeline 1232 can orchestrate data loading to the staging tables 1216 and invoke transformation within the data warehouse 1212. In some implementations, the staging tables 1216 can typically be 1:1 (one-to-one) with source entities, and thus can be easily created and loaded from each CDM folder 1208.

In some implementations, the design of the data warehouse schema may be based on predefined design patterns, e.g., dimensional, data vault, operational data store, etc. Each pattern can be decomposed into finer grained patterns. For example, dimensional can be decomposed into dimensions and fact; and data vault can be decomposed into hubs, links, and satellites.

In some implementations, transform patterns can be optimized for a specific data warehouse platform (e.g., SQL data warehouse). Transform patterns may be optimized for a specific DW platform (e.g. for SQL data warehouse) through the use of CTAS statements to copy a table, use of denormalization views, etc.

The shape of a data warehouse may be determined in large measure by the shape of the source data, for example, optimized to support specific reporting workloads. The data warehouse schema can be described in terms of mappings applied to the source schema. In some implementations, the availability of metadata in the CDM folders 1208 can accelerate design and development of the data warehouse 1212. With the system 1200, while some user input may still be required, the user input can be declarative, for example, apply dimension pattern to "Customer," apply fact pattern to "SalesOrderLine," denormalize data from "SalesOrder" onto "SalesOrderLine," use surrogate key, etc.

Structural transform patterns may define how the data shape in the source is morphed into the data shape in the target. The base entity may establish the grain of a table in the target. Denormalization and aggregation of related entities can reshape data. Filtering relationships and attributes can prune the shape.

Procedural transform patterns may define how the data is loaded into the new shape, and may include stored procedures, intermediate views and tables, derivation, and/or substitution. In some implementations, procedure transform patterns can be optimized for the data warehouse platform.

In some implementations, data from different sources may be combined. Alternatively, transactional (fact) data may come from a single source with dimensional data coming from one or more sources and with the data being conformed.

Mapping Patterns

An atomic source can be mapped to a target using mapping patterns that can be composed into more complex patterns. Source and target may be tables or views. If the target is a view, it may be a projection of the source. In some implementations, the target may have the same grain as the source, i.e., rows in the source correspond to rows in target.

Columns from the source may be mapped to columns in the target. Columns may be renamed and may have the same or a compatible datatype. More complex mappings can reference columns in scope (including denormalized, aggregated, and/or related tables). Thus, complex transformations can be decomposed into basic building blocks.

Pattern Composition

Basic patterns can be composed and/or combined to create more complex patterns. In some implementations, some patterns can be chained, so the target of one pattern is the source of another. In some implementations, some patterns are mixed-in to other patterns, e.g., historical data tracking, surrogate key substitution, etc.

Merging Data

In some implementations, upsert (a combination of "update" and "insert") may be performed via temporary table and rename. Data may be logically updated via a temporary table. CTAS may be used to create the temporary table from the target. New and modified rows may be inserted, and the new table may be switched in.

In some implementations, upsert may be performed in-place. That is, new records may be inserted, and modified and deleted records may be updated in-place. In some implementations, deleted records can be soft-deleted and hard-deleted later in batches. Other patterns may include replace, append, view-switching, and/or partitioning in place of rename.

Surrogate Keys, Denormalization, and Aggregation

With respect to surrogate key substitution, business identifiers (IDs) may be mapped to meaningless surrogate keys (e.g., integer-based) on dimensions. The business ID can be retained on the dimension to allow matching on update and substituting the foreign key on facts. Regarding denormalization, columns from a source can be denormalized into the target. For aggregation, data from a source can be aggregated into columns in the target.

Historical Change Tracking

The present concepts may include adding historical context to the target. In some implementations, certain historical attributes (such as, EffectiveDate, ExpiredData, IsCurrent, etc.) may be added to each row as additional columns. Accordingly, when updates occur, additional rows can be created and prior rows can be closed off to indicate that they are no longer current. In some implementations, history patterns can include retaining the original value, retaining a current value, retaining a prior value in a separate row or column, and/or adding rows or columns to a history table.

Figure 13:
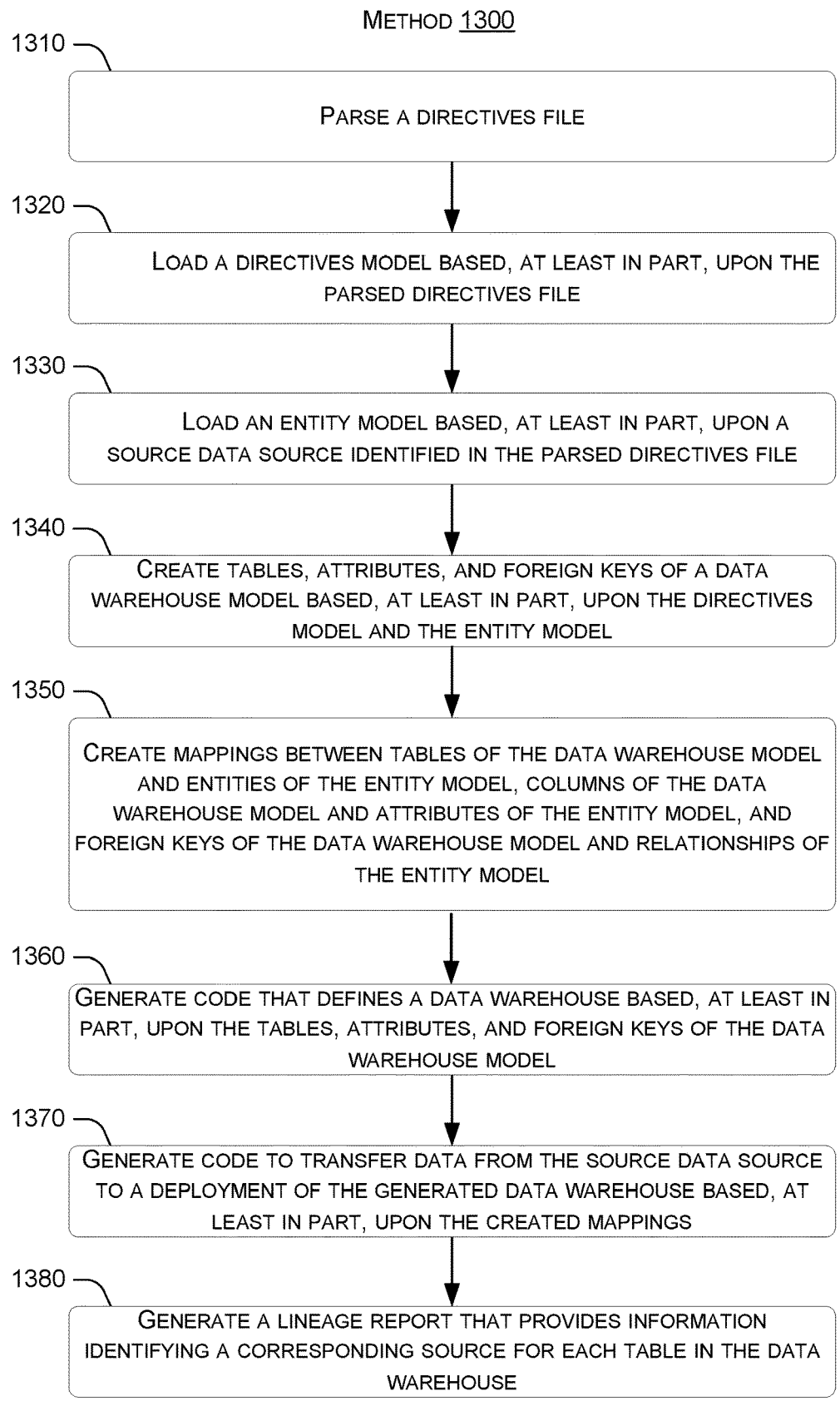
FIG. 13 is a flow chart that illustrates an example method of transforming data models, consistent with the present concepts.
Figure 14:
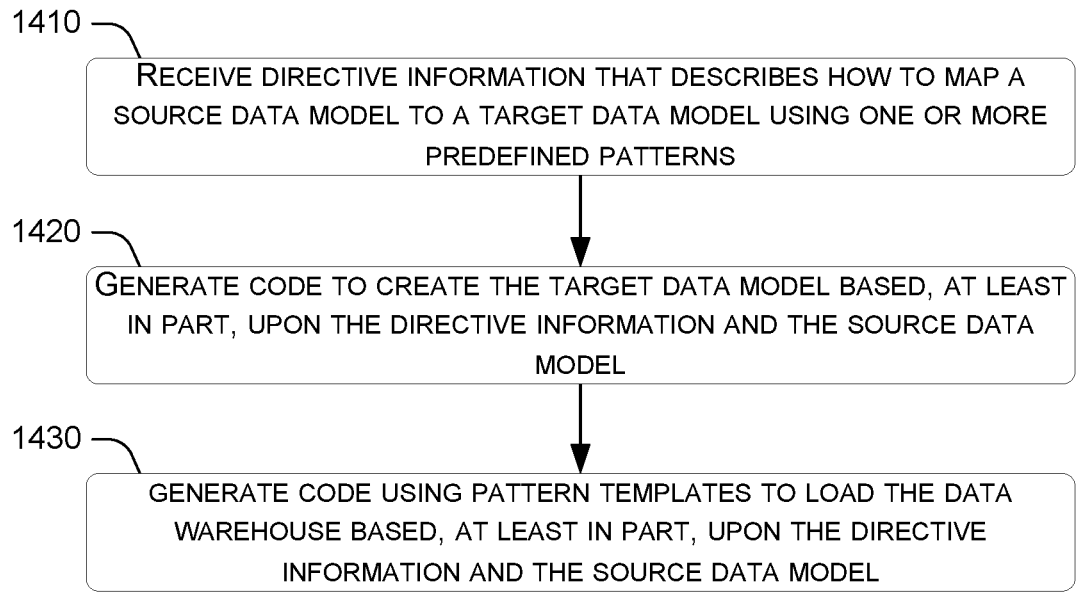
FIG. 14 is a flow chart that illustrates an example method of transforming data models, consistent with the present concepts.

FIGS. 13-14 are flow charts that illustrate example methods of transforming data models, consistent with the present concepts. In these examples, FIGS. 13-14 illustrate example methodologies relating to creating a data warehouse. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 13, a method 1300 of creating a data warehouse is illustrated. In some implementations, the method 1300 may be performed by the system 100, the system 200, and/or the system 1200, described above.

At 1310, a directives file may be parsed. At 1320, a directives model may be loaded based, at least in part, upon the parsed directives file. At 1330, an entity model may be loaded based, at least in part, upon a source data source identified in the parsed directives file.

At 1340, tables, attributes, and foreign keys of a data warehouse model may be created based, at least in part, upon the directives model and the entity model. At 1350, mappings may be created between tables of the data warehouse model and entities of the entity model, columns of the data warehouse model and attributes of the entity model, and foreign keys of the data warehouse model and relationships of the entity model.

At 1360, code that defines a data warehouse may be generated based, at least in part, upon the tables, attributes, and foreign keys of the data warehouse model. At 1370, code to transfer data may be generated from the source data source to a deployment of the generated data warehouse based, at least in part, upon the created mappings. At 1380, a lineage report may be generated that can provide information identifying a corresponding source for each table and column in the data warehouse.

Referring to FIG. 14, a method 1400 of creating a data warehouse is illustrated. In some implementations, the method 1400 may be performed by the system 100, the system 200, and/or the system 1200, described above.

At 1410, directive information that describes how to map a source data model to a target data model using one or more predefined patterns may be received. At 1420, code to create the target data model may be generated based, at least in part, upon the directive information and the source data model. At 1430, code to load the data warehouse may be generated using pattern templates based, at least in part, upon the directive information and the source data model.

Figure 15:
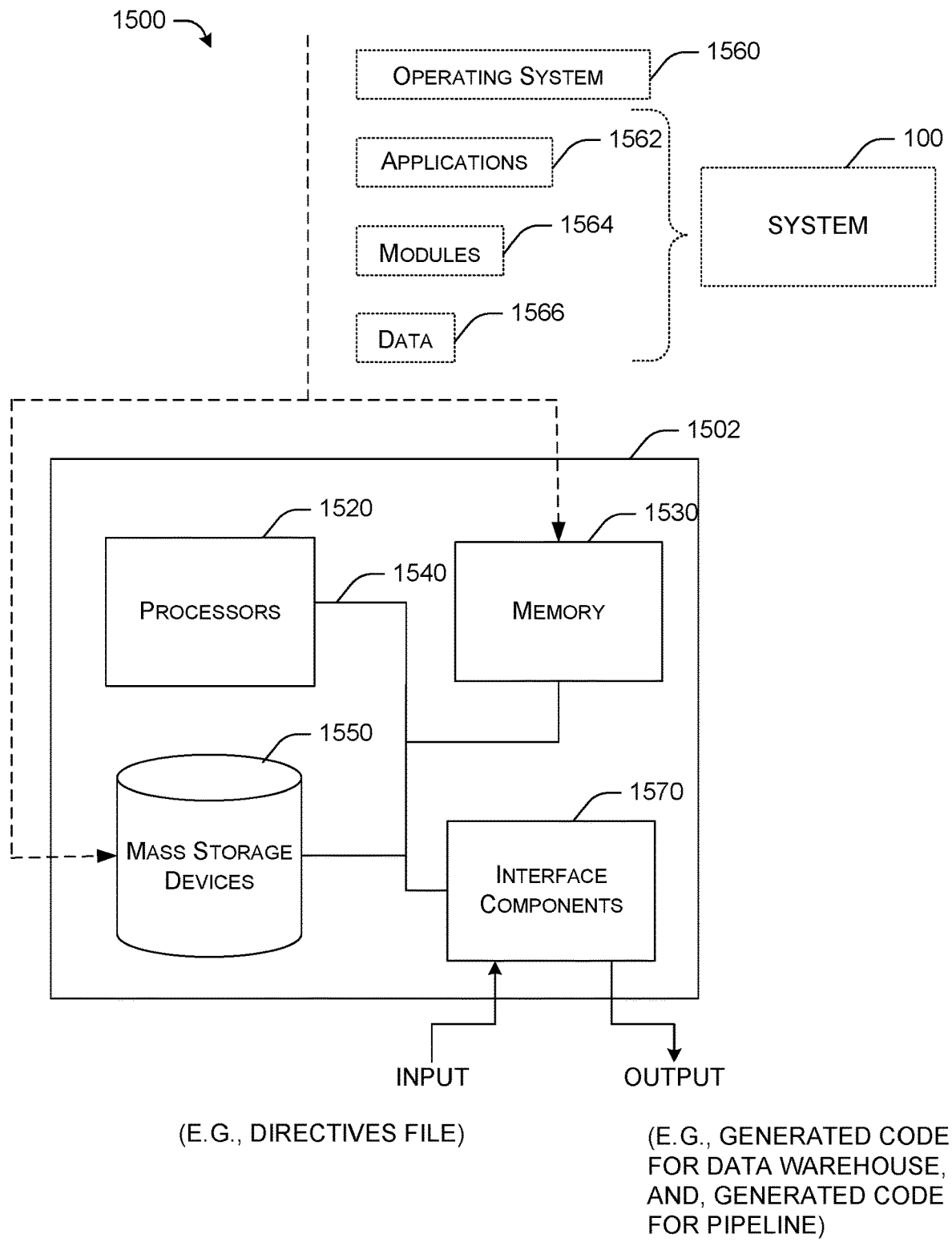
FIG. 15 is a functional block diagram that illustrates an example computing system for transforming data models, consistent with the present concepts.

FIG. 15 is a functional block diagram that illustrates an example computing system 1500 for transforming data models, consistent with the present concepts. FIG. 15 includes a computer 1502, which may be a general-purpose computer, processing system, or computing device (e.g., mobile phone, desktop, laptop, tablet, watch, server, handheld, programmable consumer or industrial electronics, set-top box, game system, compute node, etc.). For instance, the computer 1502 may be used in a system 100, system 200, and/or system 1200, described above.

The computer 1502 may include one or more processors 1520, memory 1530, system bus 1540, mass storage devices 1550, and one or more interface components 1570. The system bus 1540 can communicatively couple at least the above system constituents. In one implementation, the computer 1502 can include the one or more processors 1520 coupled to the memory 1530 that execute various computer executable actions, instructions, and or components stored in the memory 1530. The instructions may be, for instance, instructions for implementing functionality described as being carried out by one or more components discussed above or instructions for implementing one or more of the methods described above.

The processors 1520 can be implemented with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processors 1520 may also be implemented as a combination of computing devices, for example a combination of a DSP and a microprocessor, a plurality of microprocessors, multi-core processors, one or more microprocessors in conjunction with a DSP core, or any other such configuration. In one implementation, the processors 1520 can be a graphics processor.

The computer 1502 can include or otherwise interact with a variety of computer-readable media to facilitate control of the computer 1502 to implement one or more aspects of the described subject matter. The computer-readable media can be any available media that can be accessed by the computer 1502 and includes volatile and nonvolatile media, and removable and non-removable media. Computer-readable media can comprise two distinct and mutually exclusive types, namely computer storage media and communication media.

Computer storage media may include volatile and non-volatile, removable and non-removable media implemented in any method or technology for storage of information such as computer-readable instructions, data structures, program modules, or other data. Computer storage media may include storage devices such as memory devices (e.g., random access memory ("RAM"), read-only memory ("ROM"), electrically erasable programmable read-only memory ("EEPROM"), etc.), magnetic storage devices (e.g., hard disk, floppy disk, cassettes, tape, etc.), optical disks (e.g., compact disk ("CD"), digital versatile disk ("DVD"), etc.), and solid state devices (e.g., solid state drive ("SSD"), flash memory drive (e.g., card, stick, key drive, etc.), etc.), or any other like mediums that store, as opposed to transmit or communicate, the desired information accessible by the computer 1502. Accordingly, computer storage media excludes transitory signals and modulated data signals as well as that described with respect to communication media.

Communication media may embody computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The memory 1530 and mass storage devices 1550 may be examples of computer-readable storage media. Depending on the exact configuration and type of computing device, the memory 1530 may be volatile (e.g., RAM), non-volatile (e.g., ROM, flash memory, etc.) or some combination of the two. By way of example, the basic input/output system ("BIOS"), including basic routines to transfer information between elements within the computer 1502, such as during start-up, can be stored in nonvolatile memory, while volatile memory can act as external cache memory to facilitate processing by the processors 1520, among other things.

The mass storage devices 1550 may include removable/non-removable, volatile/non-volatile computer storage media for storage of large amounts of data relative to the memory 1530. For example, the mass storage devices 1550 may include, but is not limited to, one or more devices such as a magnetic or optical disk drive, floppy disk drive, flash memory, solid-state drive, or memory stick.

The memory 1530 and the mass storage devices 1550 can include, or have stored therein, an operating system 1560, one or more applications 1562, one or more program modules 1564, and data 1566. The operating system 1560 may act to control and allocate resources of the computer 1502. The applications 1562 may include one or both of system and application software and can exploit management of resources by the operating system 1560 through the program modules 1564 and the data 1566 stored in the memory 1530 and/or the mass storage devices 1550 to perform one or more actions. Accordingly, the applications 1562 can turn a general-purpose computer 1502 into a specialized machine in accordance with the logic provided thereby.

All or portions of the described subject matter can be implemented using standard programming and/or engineering techniques to produce software, firmware, hardware, or any combination thereof to control a computer to realize the disclosed functionality. By way of example and not limitation, the systems 100, 200, 1200 or portions thereof, can be, or form part, of the application 1562, and include one or more of the modules 1564 and the data 1566 stored in the memory 1530 and/or the mass storage devices 1550 whose functionality can be realized when executed by one or more of the processors 1520.

In some implementations, the processors 1520 can correspond to a system on a chip ("SOC") or like architecture including, or in other words integrating, both hardware and software on a single integrated circuit substrate. Here, the processors 1520 can include one or more processors as well as memory at least similar to the processors 1520 and the memory 1530, among other things. Conventional processors may include a minimal amount of hardware and software and rely extensively on external hardware and software. By contrast, an SOC implementation of processor may be more powerful, as it can embed hardware and software therein that enable particular functionality with minimal or no reliance on external hardware and software. For example, the systems 100, 200, 1200 and/or associated functionality can be embedded within hardware in an SOC architecture.

The computer 1502 may also include the interface components 1570 that are communicatively coupled to the system bus 1540 and facilitate interaction with the computer 1502. By way of example, the interface components 1570 can include a port (e.g., serial, parallel, PCMCIA, USB, FireWire, etc.) or an interface card (e.g., sound, video, etc.) or the like. In one example implementation, the interface components 1570 can include a user input/output interface to enable a user to enter commands and information into the computer 1502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface components 1570 can include an output peripheral interface to supply output to displays (e.g., LCD, LED, plasma, etc.), speakers, printers, and/or other computers, among other things. Still further yet, the interface components 1570 can include a network interface to enable communication with other computing devices, such as over a wired or wireless communications link.

What has been described above includes examples of aspects of the present concepts. It is, of course, not possible to describe every conceivable combination of components or methodologies for purposes of describing the present concepts, but one of ordinary skill in the art may recognize that many further combinations and permutations of the disclosed subject matter are possible. Accordingly, the disclosed subject matter is intended to embrace other alterations, modifications, and variations that fall within the spirit and scope of the present concepts.

Various examples are described above. Additional examples are described below. One example includes a system comprising a processor and a storage for storing instructions which, when executed by the processor, causes the system to: provide a graphical user interface ("GUI") to a user, receive, via the GUI, an input from the user that describes a mapping from a source data model to a target data model, present a graphical representation of the mapping to the user via the GUI, generate directives code based on the mapping, generate schema code for creating the target data model based on the directives, and generate pipeline code for transferring data from the source data model to the target data model based on the directives using predefined patterns.

Another example can include any of the above and/or below examples where the source data model is a structured query language ("SQL") database.

Another example can include any of the above and/or below examples where the target data model is a data warehouse.

Another example can include any of the above and/or below examples where the instructions further cause the system to present entities in the source data model to the user for selection via the GUI.

Another example can include any of the above and/or below examples where the mapping includes at least one of: a correspondence between an entity in the source data model and a table in the target data model, a correspondence between an attribute in the source data model and a column in the target data model, or a correspondence between a relationship in the source data model and a foreign key in the target data model.

Another example can include any of the above and/or below examples where the mapping includes at least one of data denormalization or data aggregation.

Another example includes a computer-readable storage medium storing instructions which, when executed by a processor, cause the processor to: receive directive information specifying how to map one or more source data models to a target data model using predefined pattern templates, generate schema code for creating the target data model based on the directives, and generate pipeline code for copying data from the one or more source data models to the target data model based on the directives.

Another example can include any of the above and/or below examples where the instruction further cause the processor to generate directives code based on the directives information, the directives information being provided by a user via a GUI.

Another example can include any of the above and/or below examples where the directives information includes directives code.

Another example can include any of the above and/or below examples where the directives code including JavaScript Object Notation ("JSON") language.

Another example can include any of the above and/or below examples where the schema code includes SQL language.

Another example can include any of the above and/or below examples where the pipeline code includes extract-transform-load ("ETL") code.

Another example can include any of the above and/or below examples where the target data model includes surrogate keys for at least one of a data dimension or a time dimension.

Another example includes a computer-implemented method comprising receiving, via a GUI, an input from a user, the input graphically defining mappings from a source data model to a target data model, generating first code for creating the target data model based on the mappings, and generating second code for transferring data from the source data model to the target data model.

Another example can include any of the above and/or below examples where the computer-implemented method further comprises executing the first code to create the target data model.

Another example can include any of the above and/or below examples where the computer-implemented method further comprises executing the second code to transfer data from the source data model to the target data model.

Another example can include any of the above and/or below examples where receiving the input comprises receiving a first selection from the user of an entity or an attribute in the source data model and receiving a second selection of a dimension table, a fact table, or a column in the target data model.

Another example can include any of the above and/or below examples where the computer-implemented method further comprises graphically displaying the mappings to the user via the GUI.

Another example can include any of the above and/or below examples where the computer-implemented method further comprises generating directives code based on the mappings.

Another example can include any of the above and/or below examples where the computer-implemented method further comprises generating a lineage report that traces tables and/or columns in the target data model to corresponding entities and/or attributes, respectively, in the source data model.

The invention claimed is:
1. A system, comprising:
   a processor; and
   a storage for storing instructions which, when executed by the processor, causes the system to:
      provide a graphical user interface ("GUI") to a user that enables the user to graphically model mappings from a source data model to a target data model, the GUI presenting a graphical representation of the mappings to the user;
      receive, via the GUI, an input from the user that graphically represents the mappings;
      generate directives code for defining directives based on the mappings;
      generate schema code for creating the target data model based on the directives; and
      generate pipeline code for transferring data from the source data model to the target data model based on the directives using predefined patterns.
2. The system of claim 1, wherein the source data model is a structured query language ("SQL") database.
3. The system of claim 1, wherein the target data model is a data warehouse.
4. The system of claim 1, wherein the instructions further cause the system to:
   present entities in the source data model to the user for selection via the GUI.
5. The system of claim 1, wherein the mappings include at least one of:
   a correspondence between an entity in the source data model and a table in the target data model;

a correspondence between an attribute in the source data model and a column in the target data model; or a correspondence between a relationship in the source data model and a foreign key in the target data model.

6. The system of claim 1, wherein the mappings include at least one of data denormalization or data aggregation.

7. A computer-readable storage medium storing instructions which, when executed by a processor, cause the processor to:

receive directives information from a user via a graphical user interface ("GUI"), the directives information being provided graphically by the user using the GUI, the directives information specifying how to map one or more source data models to a target data model using predefined pattern templates;

generate schema code for creating the target data model based on the directives information; and generate pipeline code for copying data from the one or more source data models to the target data model based on the directives information.

8. The computer-readable storage medium of claim 7, wherein the instructions further cause the processor to:

generate directives code based on the directives information.

9. The computer-readable storage medium of claim 7, wherein the directives information includes directives code.

10. The computer-readable storage medium of claim 9, wherein the directives code includes JavaScript Object Notation ("JSON") language.

11. The computer-readable storage medium of claim 7, wherein the schema code includes SQL language.

12. The computer-readable storage medium of claim 7, wherein the pipeline code includes extract-transform-load ("ETL") code.

13. The computer-readable storage medium of claim 7, wherein the target data model includes surrogate keys for at least one of a data dimension or a time dimension.

14. A computer-implemented method, comprising:

receiving, via a graphical user interface ("GUI"), an input from a user, the input including mappings from a source data model to a target data model, the mappings being graphically defined by the user using the GUI;

generating first code for creating the target data model based on the mappings; and generating second code for transferring data from the source data model to the target data model based on the mappings.

15. The computer-implemented method of claim 14, further comprising:

executing the first code to create the target data model.

16. The computer-implemented method of claim 15, further comprising:

executing the second code to transfer data from the source data model to the target data model.

17. The computer-implemented method of claim 14, wherein receiving the input comprises:

receiving a first selection from the user of an entity or an attribute in the source data model; and receiving a second selection of a dimension table, a fact table, or a column in the target data model.

18. The computer-implemented method of claim 14, further comprising:

graphically displaying the mappings to the user via the GUI.

19. The computer-implemented method of claim 14, further comprising:

generating directives code based on the mappings.

20. The computer-implemented method of claim 14, further comprising:

generating a lineage report that traces tables and/or columns in the target data model to corresponding entities and/or attributes, respectively, in the source data model.

* * * * *